(12) United States Patent
Simmons et al.

(10) Patent No.: US 8,065,253 B2
(45) Date of Patent: Nov. 22, 2011

(54) KNOWLEDGE DISCOVERY SYSTEM WITH USER INTERACTIVE ANALYSIS VIEW FOR ANALYZING AND GENERATING RELATIONSHIPS

(75) Inventors: Hillery D. Simmons, Chicago, IL (US); Rhazes Spell, Chicago, IL (US); Emil Robert Martinsek, San Francisco, CA (US); Karoline Evans, Sewickley, PA (US); Daniel R. Madigan, Arlington, VA (US); Ryan Matthew LaSalle, Chicago, IL (US)

(73) Assignee: Accenture Global Service Limited, Dublin (IE)

( * ) Notice: Subject to any disclaimer, the term of this patent is extended or adjusted under 35 U.S.C. 154(b) by 0 days.

(21) Appl. No.: 13/093,243

(22) Filed: Apr. 25, 2011

(65) Prior Publication Data

US 2011/0202525 A1 Aug. 18, 2011

Related U.S. Application Data

(63) Continuation of application No. 12/843,694, filed on Jul. 26, 2010, now Pat. No. 7,953,687, which is a continuation of application No. 11/598,292, filed on Nov. 13, 2006, now Pat. No. 7,765,176.

(51) Int. Cl.
*G06F 17/00* (2006.01)
*G06N 5/00* (2006.01)

(52) U.S. Cl. .................................................. 706/45

(58) Field of Classification Search ................ None
See application file for complete search history.

(56) References Cited

U.S. PATENT DOCUMENTS

| 6,201,482 | B1 * | 3/2001 | Schiefele et al. ............. 340/961 |
| 7,765,176 | B2 | 7/2010 | Simmons et al. |
| 7,953,687 | B2 | 5/2011 | Simmons et al. |
| 2002/0072865 | A1 * | 6/2002 | Hogue et al. ................... 702/27 |

OTHER PUBLICATIONS

Guo "Coordinating computational and visual approaches for interactive feature selection and multivariate clustering", Information Visualization (2003), pp. 15.*

* cited by examiner

*Primary Examiner* — Jeffrey A Gaffin
*Assistant Examiner* — Li-Wu Chang

(57) ABSTRACT

A knowledge model discovery system is configured to provide an interactive view having simultaneously displayed sub-views that include a relational data element view and a contextual view. Using the interactive view, a user may perform search and analysis of information organized with a knowledge management tool in conjunction with contextual information. The relational data element view may provide a relational visualization that displays data elements provided with the knowledge management tool as narrowed by the context of a user analysis. The contextual view may provide a depiction of the same data elements using a similar context. The relational data element view and the contextual view may be operated in coordination to maintain cohesiveness and similar context of the information displayed in the views.

18 Claims, 8 Drawing Sheets

KNOWLEDGE DISCOVERY SYSTEM WITH USER INTERACTIVE ANALYSIS VIEW FOR ANALYZING AND GENERATING RELATIONSHIPS

CLAIM OF PRIORITY

This application is a continuation application of U.S. application Ser. No. 12/843,694 filed Jul. 26, 2010, now U.S. Pat. No. 7,953,687, which is a continuation application of U.S. application Ser. No. 11/598,292 filed Nov. 13, 2006, now U.S. Pat. No. 7,765,176.

FIELD OF THE INVENTION

The present invention relates to a data search, access, and manipulation system, and more particularly to a geographic and relational data search tool that provides a visually based context to categorize, organize, and interactively analyze search results for relationship and knowledge discovery.

BACKGROUND

Data storage in a database and access therefrom is a common theme in most digital data access and storage systems. With today's hardware capabilities, the size and complexity of databases, and the amount of data stored therein is almost unlimited. With the number and size of databases available, researchers face a daunting task when performing searches related to a particular topic or subject matter. These difficulties are further compounded with data from the public domain (Internet, public databases, Web services, etc.) that all contribute to a large "haystack" within which a researcher must find a "needle."

In addition, because information is distributed among a large number of resources, a researcher is faced with the prospect of running queries in a number of databases on each subject matter or topic of interest. When additional subject matter related to the subject matter or topic of interest is found in one of the databases, a researcher must once again query many different databases with the additional subject matter.

For any given query, the researcher also may be faced with sifting through potentially thousands of documents in order to determine the relevancy of the query results. When the researcher is also interested in physical geographic locations related to subject matter or topic of interest, separate or combined geographically based queries must be initiated in each of a number of databases, with the query result again being up to thousands of documents that must be individually reviewed for relevancy. As relevant documents are identified, the researcher is also faced with organizing the documents, or information contained therein, to provide visually coherent results of the research that reflect the relationships between the various identified sources of information. Also, the researcher may need to remember the series of queries and other steps that were performed to find the relevant information for purposes of recreating the results or performing a similar research project on a different topic.

SUMMARY

The presently described knowledge discovery system provides search and analysis capability to access information from any number of data sources. In addition, the system enables organized and efficient display, manipulation, and analysis of information within a context of a search or analysis. The system includes a plurality of views that are cohesively associated to maintain coordination and alignment of the views. Through selective manipulation of the information in any one of the views, previously unidentified relationships and associations within the displayed information may be identified and/or established.

The knowledge discovery system is configured to provide an interactive view that includes a plurality of sub-views at the same time. One of the sub-views is a relational data element view. The relational data element view may display a plurality of data element indicia representative of data elements and a plurality of relationship indicia representative of relationships between at least some of the data elements. The data elements may be information derived from various sources that are organized and maintained in at least one database. The interactive view also includes a sub-view that is a geophysical view. The geophysical view may include a geographic map with at least some of the data element indicia depicted in the relational data element view displayed thereon.

The relational data element view and the geophysical view may each be monitored for adjustments to the displayed information. The information included in the sub-views may be adjusted by drag and drop, mouse clicks, menus, command entry, or any other mechanism. Also, filtering, layer changes, and any other data organization techniques may be used to adjust the sub-views. When an adjustment occurs in one sub-view, a corresponding adjustment may occur automatically in another of the sub-views. All of the sub-views may be maintained in alignment based on data element identifiers (DEID's) that are uniquely assigned to each data element.

Relationships may also be automatically or manually established between the data elements. Establishment of relationships may be based on a confidence value representative of the reliability of a link between the data elements. Confidence values may also indicate the reliability of a data element. Confidence values may be calculated based on factors related to the data element(s). Using the relational data element view and the geophysical view, previously unknown relationships between data elements may be identified.

These implied relationships may be associated with the data elements and indicated when the data element indicia representative of the data elements are displayed. Using the sub-views that depict the data element indicia, relationships, and categorization of the data elements, a more focused and relevant result may be obtained. In addition, the interactive and coordinated adjustment of the sub-views allow the context of the analysis to be filtered, modified, and/or changed based on adjustments to the displayed information to achieve the desired goal(s) of the analysis.

Further objects and advantages of the present invention will be apparent 20 from the following description, reference being made to the accompanying drawings wherein preferred embodiments of the present invention are clearly shown.

DETAILED DESCRIPTION

Figure 1:
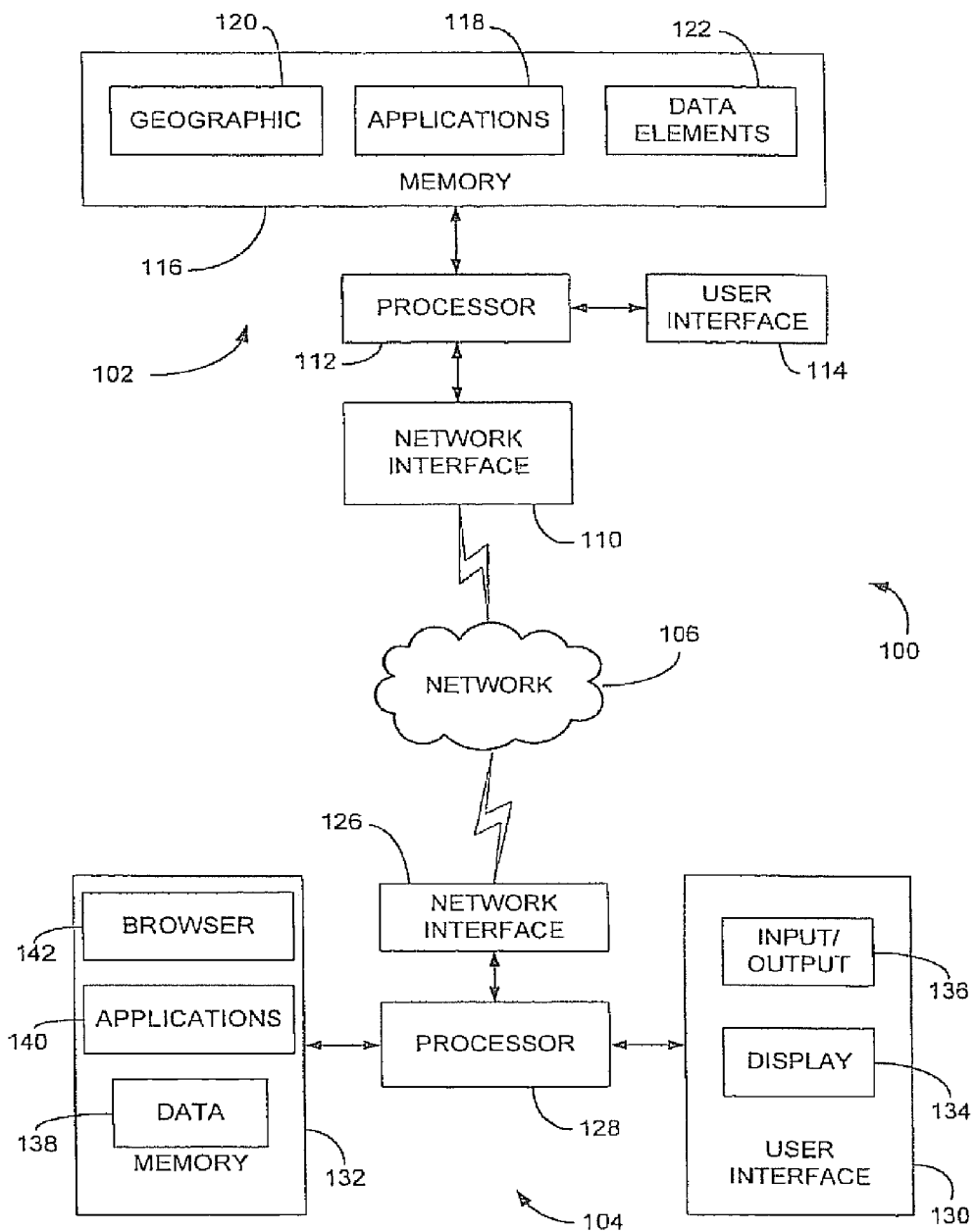
FIG. 1 is a block diagram of an example knowledge discovery system.

FIG. 1 is an example block diagram of a knowledge discovery system 100. The knowledge discovery system 100 may be implemented to include any number of servers 102 in communication with each other and any number of user work stations 104 over a network 106. The network 106 may include the Internet, an intranet, an extranet, or any other form of communication backbone that provides a communication framework between computing devices. Communication within the network 106 may be performed with a communication medium that includes wireline-based communication systems and/or wireless-based communication systems. The communication medium may be, for example, a communication channel, radio waves, microwave, wire transmissions, fiber optic transmissions, or any other communication medium capable of transmitting data, audio, and/or video information. Communication over the network 106 may be implemented in any communication language or protocol, such as a packet based protocol. In other examples, the knowledge discovery system 100 may be implemented on a single computer, such as the user workstation 104 or the server 102.

The server 102 may be any form of computing device(s) capable of receiving requests and transmitting responses over the network 106. In addition, the server 102 may be capable of performing the functionality hereinafter described. The server 102 may include a network interface 110, a processor 112, a user interface 114, and a memory 116. The network interface 110 is coupled with the network 106, and may be any combination of hardware and software that interfaces with, and enables communication over the network 106. For example, the network interface 110 may be a NIC card operable with TC/PIP, or a modem. The processor 112 may be any device(s) or mechanism(s) capable of executing instructions, receiving inputs, and generating outputs, such as a central processing unit (CPU). The processor 112 may direct the operation and provide the overall functionality of the server 102. The processor 112 is coupled with the network interface 110 and may transmit and receive communication over the network 106. As used herein, the term "coupled," "connected," or "interconnected" may mean electrically coupled, optically coupled, wirelessly coupled, and/or any other form of association providing an interface between systems, devices, and/or components.

The user interface 114 may include a display, such as a graphical user interface (GUI), and an input device, such as a keyboard, touch screen, or microphone. In addition, the user interface may include a pointing device, such as a mouse or stylus, and/or any other device(s) or mechanism(s) that provide a user with the capability to provide to the processor 112 and/or receive from the processor 112 information and/or commands.

The memory 116 may be one or more information storage devices accessible with the processor 112. The memory 116 may be at least one magnetic data storage device, such as a hard drive, an optical disk, a magnetic tape, etc., and/or at least one electronic memory device such as flash memory, random access memory (RAM), etc. The memory 116 may be located within the server 102. Alternatively, the memory 116 may be located anywhere that allows communication with the server 102 over the network 106. In another alternative, a portion of the memory 116 may be located within the server computer 102, and other portion(s) of the memory 116 may be located elsewhere within the network 106.

The memory 116 may include applications 118, a geographic database 120, and a data elements database 122. In other examples, the geographic database 120 and the data elements database 122 may be a single database or multiple databases. The applications 118 may include an operating system to provide the operational functionality of the server 102, communication applications, database related applications, and any other software and/or firmware programs to provide the functionality described herein. The applications may be stored in the memory 116 in the form of instructions that are executable with the processor 112.

The geographic database 120 may include geographic data stored in a database format, such as a relational database, or any other structured format, such as XML, proprietary data storage systems, commercially available data storage systems, etc. The geographic data may include geographical map data that includes latitude and longitude data for any location in the world. In addition, the geographical data may include topographical and point-of-interest (POT) data for each location in the world. Topographical data may include buildings, roads, bridges, oceans, rivers, lakes, mountains, forests, deserts, valleys, and/or any other landmarks or structures. P01 data may include country names, region names, city names, area names, street names, identification of landmarks, and any other information relevant to a particular location. The contents of the geographic data may be similar to the data included in a map routing tool, such as a vehicle navigation system, or mapquest.com.

The data elements database 122 may include data elements and related information in the form of a database. The data elements may be terms or other forms of information derived from documents or any other source of information. Each of the data elements may be stored in the data element database 122 in association with a link or some other form of indicator providing the source from which the data elements were derived.

The data elements database 122, that includes the data elements, may be created with a knowledge management tool. Example knowledge management tools are described in U.S. Pat. No. 6,564,209 issued May 13, 2003, U.S. Pat. No. 6,721,726 issued Apr. 13, 2004, U.S. Pat. No. 6,727,927 issued Apr. 27, 2004, and U.S. Pat. No. 6,900,807 issued May 31, 2005, all of which are incorporated herein by reference in their entirety. The knowledge management tool may extract data from various sources using an intelligent extraction process. In the intelligent extraction process, the data elements are derived and stored in the database. The data elements may be derived from terms in the source information by extracting, cleansing, and prioritizing the terms to comply with a particular ontology. Extracting terms may involve data mining, text processing, text mining, and/or any other techniques for identifying desired terms in sources of information. For example, the intelligent extraction process may find a document that discusses a particular drug; thus, the data element may be the name of the particular drug. In addition to identifying the source from which the data elements were derived, the intelligent extraction process may also automatically assign one or more categories to each of the data elements. The category(s) may provide an indication of the context in which the data elements were used in the source document. For example, a document that discusses a drug may discuss use of the drug to combat bird flu; thus, one category associated with this data element may be bird flu.

The intelligent extraction process may also identify relationships between data elements and automatically provide corresponding links. For example, if two documents from which data elements were derived included a common author, or common subject matter, a relationship may be identified between the data elements automatically with the intelligent extraction process. Such relationships may be subject matter related, location related, author related, and/or based on any other form of commonality between data elements and/or the sources from which the data elements were derived. Commonality perceived by the intelligent extraction process between the data elements and/or sources may result in the automated generation and storage of a data link indicative of a relationship between data elements. Accordingly, ontology formed with the data element database 122 may be a network of relationships that are self-describing and may be used to track how items or words relate to one another. For example, a "lives at" link or "works for" link in the database could be used to track these types of relationships and their corresponding values for listed individuals.

The resulting ontology formed with the data elements, categories, and links provides a database of data elements that allow users access to any number of separate sources as if the data resided in one vast, all-encompassing database. Also, because of the category assignments, a user can narrow the search to data elements within a particular category. For example, searching for the term "green" could be significantly narrowed by identifying a category such as person. In addition, the links created by the intelligent extraction process to indicate relationships between data elements, may provide additional information related to the searched term. For example, if a search is made for a particular person, the results may not only include a data element representative of the person, but also other categories of data element(s) related to the person's work, finances, interests, clients, associates, business, projects, etc. depending on the other data elements linked to the person's data element within the database.

The data elements included in the data element database 122 may each be associated with a unique data element identifier (DEID). The DEID may be assigned at the time the data element is created, and may uniquely identify the corresponding data element throughout the knowledge discovery system 100. The DEID may also be present in the geographic database 120 to associate the data elements with geographically related information. Accordingly, separate non-redundant information associated with each data element may be included in both the data element database 122 and the geographic database 120 based cm the DEID. Thus, when updates, modifications, additions, etc. are made with respect to a particular data element, based on the DEID, information in either database may be modified. In other examples, the data element database 122 and the geographic database 120 may be combined to form a single database.

The user workstation 104 may be any form of computing device(s) with data viewing, data modification, and data manipulation capability that is also able to communicate over the network 106. The user workstation 104 includes a network interface 126, a processor 128, a user interface 130, and a memory 132. Similar to the server 102, the network interface 126 may provide access to send and receive information over the network 106, and the processor 128 may be any device or mechanism capable of executing instructions, as previously discussed. The processor 128 may direct the overall operation and functionality of the user work station 104.

The user interface 130 may provide a visual and/or auditory mechanism to exchange information and commands between a user and the user work station 104. Accordingly, the user interface 130 may include at least one display 134, such as a graphical user interface (GUI). The display 134 may also include touch 5 screen capability to operate as both an output device and an input device. The user interface 130 may also include an input/output 136. The input/output may include a pointing device, such as a mouse or stylus; a microphone/speaker to transmit and receive audible sound, such as voice commands; a keyboard; and/or any other mechanism capable of sending and receiving commands and information.

The memory 132 is similar to the memory 116 of the server 102, in that the memory 132 may be any mechanism or device capable of storing and providing access to information, as previously discussed. The memory 132 may include data 138, applications 140, and a browser 142. The data 138 may include any information stored by a user, as well as operations and results information as described herein. The applications 140 may include the operating system for the user workstation 104, communications, and any other functionality that can be made available in a workstation.

The browser 142 may be any from of application, such as Netscape™ or Internet Explorer™ used to view and interact with various types of resources available over the network 106. The browser 142 may facilitate the display of pages or files received from the network 106. In one example, the browser 142 may receive an interactive view provided as a portal from the server 102. The interactive view may be displayed on the display 134 by the browser 142. The user may interact with the interactive view via the browser 142 using the input/output 136. In other examples, where the system is not a web or portal based system, the browser 142 may be omitted.

During operation, the user workstation 104 may use the interactive view to commission a search within the knowledge discovery system. The search may be a deductive analysis having a known objective, or an inductive analysis having an unknown objective. Using tools within the knowledge discovery system 100 that are accessible via the interactive view, the user may characterize or otherwise add context to the terms included in a search. The search and associated context may be provided over the network 106 to the server 102. The server 102 may extract information from the data elements database 122 and the geographic data database 120 based on the search terms and the context. The extracted information may be transmitted over the network 106 to the user workstation 104.

The interactive view may include a first view, to display the information extracted from the data element database 122. The first view may also be referred to as a relational data element view. In network based infrastructures, the first view may be a first portlet within the interactive view that is a portal. The first view may be a link-based view that displays a plurality of data element indicia representative of respective data elements, and relationship indicia representative of relationships between at least some of the data elements. The interactive view may also include a second view that may be a map-based view that displays information extracted from the geographic database 120. The second view may also be referred to as a geophysical view. In network based infrastructures, the second view may be a second portlet within the interactive view that is a portal. The second view may display at least some of the data element indicia displayed in the first view in a geographic context, in association with other data element indicia that are not displayed in the first view.

Display of data element indicia representative of the same data element in both the first and second views may be accomplished using the DEID of the data element. Information needed to represent the data element in each of the views may be retrieved from the geographic database 120 and the data element database 122 based on the DEID of the data element. Based on the combination of the link-based first view, and the map-based second view of a plurality of data element indicia, a user may uncover derivative, or hidden relationships among the displayed data elements based on the concept of "six degrees of separation." The term "six degrees of separation" or "six links rule" refers to a hypothesis that anyone, or anything, can be connected to any other respective person or thing through a chain of acquaintances, or relationships that includes no more than five intermediaries. For example, terms in a dictionary that include a "see also" link will provide a link to any other term in the dictionary that includes a "see also" link within six or less such links. Based on the DEID, data requests, changes, modifications, additions, etc. related to the information associated with a particular data element may be seamlessly allocated to the appropriate database.

Figure 2:
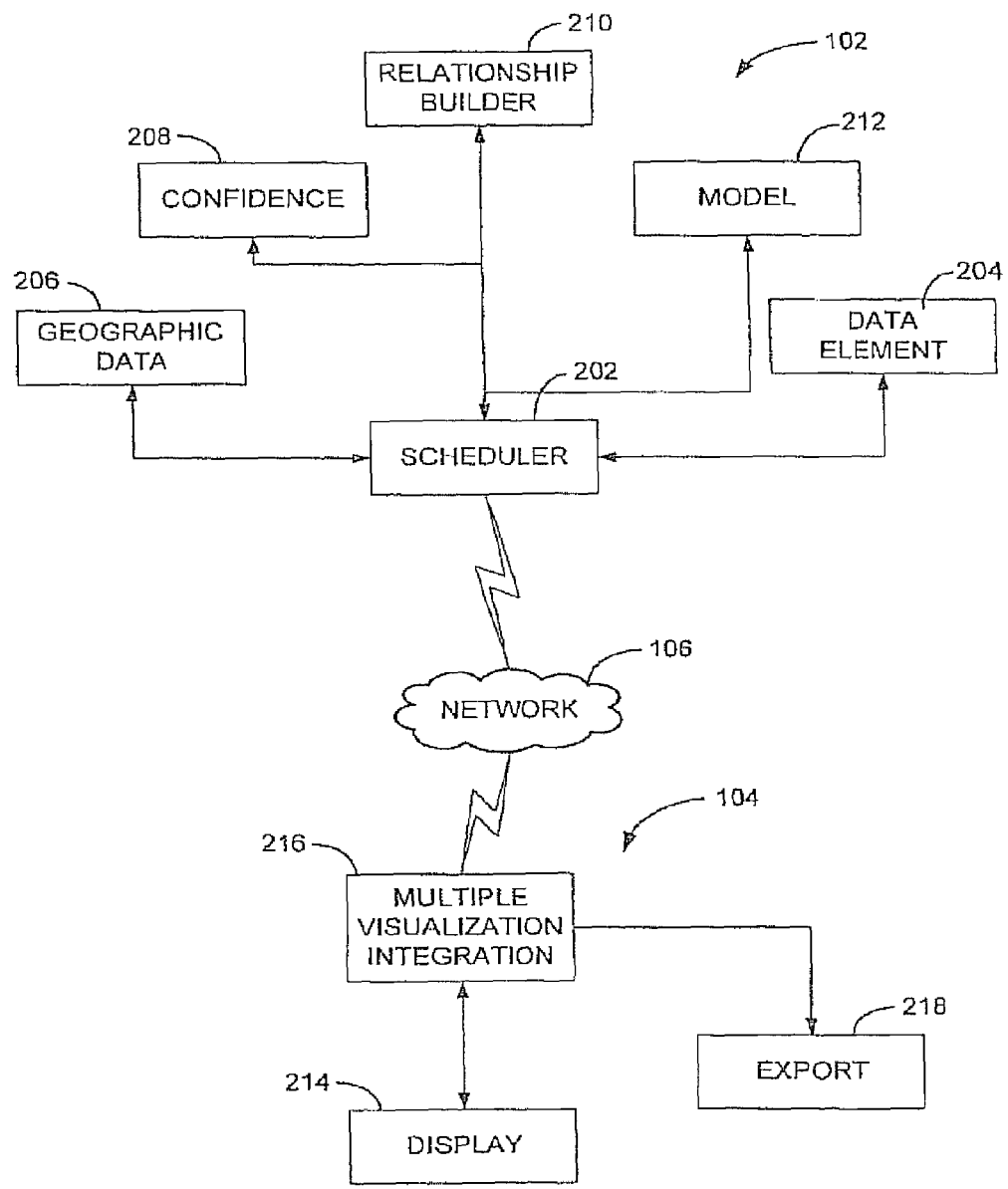
FIG. 2 is a block diagram illustrating example functionality of a server computer and a user workstation included in the knowledge discovery system depicted in FIG. 1.

FIG. 2 is a block diagram illustrating example functionality of the server 102 and the user workstation 104 illustrated in FIG. 1. In FIG. 2, the server 102 may include a plurality of modules that include a scheduler module 202, a data elements module 204, a geographic data module 206, a confidence module 208, a relationship builder module 210, and a model module 212. In other examples, fewer or greater numbers of modules may be depicted to illustrate the functionality herein described.

The scheduler module 202 may operate to receive and process requests received over the network 106. In addition, the scheduler module 202 may receive responses to requests and provide them over the network 106. Accordingly, the scheduler module 202 may provide coordination and scheduling of received requests and responses. Also, the scheduler module 202 may provide request and response conversion functionality to conform requests and responses to a format and language that is compatible with the ultimate recipient of the request or response.

The data elements module 204 may provide management of the data element database, such as database access and manipulation capability. In addition, the data elements module 204 may enable the addition and amendment of information in the data element data base, such as data elements, and information related thereto. Also, the data elements module 204 may generate responses to requests using data extracted from the data elements database. The geographic data module 206 may provide management of the geographic data database. Management may include read/write capability, as well as the ability to generate responses to requests. During operation, requests may be supplied to the data elements module 204 and/or the geographic data module 206 to generate views on the user workstation 104. The responses generated by the data elements module 204 and/or the geographic data module 206 may be provided as displayable information related to the respective data. Requests and responses may include the DEIDs of the data elements.

The confidence module 208 may generate one or more confidence values related to a relationship between data elements stored in the database. The confidence value, or link strength between data elements, may be generated by the confidence module 208 in response to a user request. The confidence value may be an indication of the relative strength of the association, or relationship, between two or more data elements. Alternatively, or in addition, the confidence value may be derived to indicate the relative strength of a corresponding data element in one or more different contexts or ontologies. Alternatively, or in addition, the confidence module 208 may be enabled to determine confidence values at the time data elements are formed.

Thus, the confidence value relative to a single data element may be representative of the veracity or reliability of the corresponding data element. Since a data element may be highly reliable in one regard and less reliable in another, multiple confidence values may be available/determined for a data element. The different confidence values may be selectively determined based on the context in which the data element is used. For example, a data element related to a person may have a high confidence value due to the source from which the data element was derived, but may have a lower confidence value related to a geographic location of the person due to the age of the source, such as the date of a document source.

Determination of the confidence values may be based on any factors related to the data elements, such as the nature of the source from which the data elements were derived, the author or publisher of the source, the degree of similarity in the context of the sources, the number of occurrences of terms from which a data element was derived, occurrences of the data elements in the database, geographic locality relationships of the data elements, productivity of data mining algorithms, or any other parameters indicative of the likelihood that a relationship exists between data elements or the reliability of the data elements.

The confidence module 208, may also apply weighting to certain information dependent on the ontology, or context in which the relationship is being considered. Such weighting may be applied to the sources from which data elements are derived, geographic location information, existing relationships between data elements, and/or any other factors considered in developing the confidence value of a relationship or data element. For example, if a relationship in the context of a search related to geographic location of two data elements is being determined, the geographic location information would be weighted more heavily. In another example, determination of the confidence value for a relationship between two data elements related to a search subject involving family lineage of a certain person would weight existing relationships between data elements more heavily.

The data source also may be weighted. The weighing may be based on the authority from which the information was obtained, in an example of searching for occurrences of a health diagnosis, such as small pox, classes of data sources, such as government issued reports, hospital records, designated health organization reports, such as those produced by the World Health Organization (WHO), could be assigned varying predetermined weightings. Such weightings could be applied to determine a confidence value for data element(s) derived from the source(s).

The confidence value(s) may be used in the knowledge discovery system 100 to allow the ordering and reasoning of links that are automatically accomplished by the previously discussed knowledge management tool or manually established by a user. The confidence value(s) calculated for any given link or data element may allow filtering of search results and relevant transitive reasoning to include in the search results only links and/or data elements with a determined level of confidence.

The confidence module 208 also may be operated to determine confidence values at the time a search is being performed. Thus, relationships between data elements may be considered by the confidence module 208, and confidence values may be determined in the context of the category or classification of the search, and the search terms used therein. Using the confidence values in the context or classification of the search being performed, the search results may be made relevant to the frame of reference of the search, independent of confidence values determined in other ontologies and/or classifications. Confidence values may also be determined at the time data elements are being derived, or any other time when confidence values may be used. Accordingly, confidence values may be used to filter or otherwise characterize and/or focus the search result.

In one example, relationship strength, or link strength, between data 10 elements may be based on a sliding scale, such as with confidence values from 1.0 to 0.0. The maximum confidence value in the sliding scale, such as 1.0, may be representative of absolute certainty in a relationship between data elements. For example, a relationship between a data element that is a chemical and a data element that is a physical or chemical property of that chemical may have the maximum confidence value. In other examples, any other criteria may be used to represent varying relationship strengths among data elements.

In this example, in order to determine the link strength between two data elements, or entities, one or more different confidence values may be used. Where more than one different confidence value can be determined, the confidence values may be separately derived and then combined, or one confidence value may be the result of combined information from different data sources. Alternatively, the confidence values may be maintained/determined in various categories based on the type of data elements, the classification, the ontology, the nature of the search, or any other parameter.

A first example of a type of confidence value that may be determined is one that can be based on the source from which a data element was derived. Accordingly, consideration of the quality of the source from which the data element was derived may result in a confidence value. For example, when the source is a document source, the quality of the source may be based on who wrote the document, the reliability and accuracy of the author, the reliability and accuracy of the publisher, or any other parameter indicative of the veracity of the document or other source. In one example, the following table may be used to derive a value for the first confidence value based on the source:

| Confidence Value | Source description |
| --- | --- |
| 1.0 | Senior Analysts' Report |
| 0.9 | Lower-level analysts' reports |
| 0.8 | Major News Outlets (CNN, Al-Jazeera, BBC, NYT, WSJ) |
| 0.7 | U.S. Government Reports and Cases |
| 0.6 | Non-governmental, International, Local, and Regional Organization Reports |
| 0.5 | Minor News Outlets (Local and Regional News) |
| 0.4 | Government Sponsored Websites |
| 0.3 | High-profile blogs (The Daily Dish by Andrew Sullivan) |
| 0.2 | Editorial, satirical, and political outlets not covered above |
| 0.1 | B logs and other webpages. |

A second example type of confidence value determination may be based on consideration of nearness of two or more data elements and a determination of a confidence of the link therebetween. Nearness may be based on semantic nearness and/or geographic location nearness.

In the case of geographic nearness, the geographic location information associated with data elements may be considered. The geographic nearness may be based on a geographic nearness threshold value, such as a predetermined number of meters or kilometers. The geographic nearness threshold value may be set by a user, or automatically determined based on context or predetermined rules. In addition, geographic nearness may stem from a contextual understanding of what the user or knowledge discovery system considers to be "near." Two cities may be near each other in the context of travel via airplane, but far from each other in the context of travel by automobile. Thus, the definition of nearness may be a tunable/settable parameter by the knowledge confidence system to obtain a corresponding confidence value within a particular context.

Geographic nearness also may include geographic locations that are not physically located proximate to each other, but are closely associated due to relationships between the cities in the context of the analysis. In other words, it is not just latitude and longitude that can provide geographic nearness, but also that two geographic locations are closely linked with relationships. For example, the United States and Israel may not be geographically proximate, but may be exhibit geographic nearness due to relationships between the two countries in a political context. In another example, within a political context, 1600 Pennsylvania Street in Washington D.C, and 10 Downing Street in the United Kingdom, although far apart in geographic location, may include an indication of geographic nearness.

In the case of semantic nearness, a confidence value may be determined based on the proximity of the information within a source from which the respective data elements were derived. In the example of a document source, the confidence value for semantic nearness could be based on consideration of the respective location within the document of the respective terms from which the respective data elements were derived. The further apart the respective terms appear within a source, the lower the confidence value. A confidence value based on proximity of terms in a source may be calculated without any regard for the size of the source, such as the number of words in a document. Although this may skew the results slightly, the approximation may be acceptable. Alternatively, the size of the source may be a consideration in determining a confidence value based on semantic nearness.

If there are multiple occurrences of the respective terms used to derive 20 the respective data elements within a single source, the occurrences of the terms closest to the beginning of the source may be used to calculate the confidence value based on semantic nearness. The determination of the distance from the beginning of the source may be based on the number of characters, or the number of words. In another example involving multiple terms, the smallest number of terms between terms of interest may be used to determine a confidence value. For example, in a document source, if the data elements are "dog" and "cat," and the term "dog" appears at an offset of 100 words and again at 1,000 words from the beginning of the document, and the term "cat" appears at an offset of 300 words and again at an offset of 1,500 words from the beginning of the document, the difference of 200 words (the smaller number of words) between the first occurrence of "dog," and the first occurrence of "cat" may be used to determine the confidence value.

When the number of characters of offset is less than a determined maximum offset range, the calculation of the second confidence value may be:

$$\text{confidence value} = \left(1 - \left(\frac{\text{\# of char. offset}}{K}\right)\right) \qquad \text{Equation 1}$$

where K can be a constant value based on the determined maximum that the respective terms can be offset from one another. For example, anytime that the offset between respective terms is less than 1800 words, K=2000. Thus, in the above example, with a character offset of 200 words, and thus K=2000, the calculation may be: Confidence factor=1−(200/2000). When the terms are offset by more than a maximum limit, the second confidence value may default to a predetermined value. For example, if the maximum limit is 1800 words, when the number of characters by which respective words are offset from each other is greater than or equal to 1800, the second confidence value may be 0.1 by default.

Another classification technique that may be used to determine a confidence value when there are multiple terms in a source is related to the number of terms within the source, such as a document. When multiple terms of interest exist, a proximity calculation that involves all occurrences of all the terms and the offset from the beginning of the document may be used. For example, if the data elements are "dog" and "cat," and the term "dog" appears at an offset of 100 words and again at 1,000 words from the beginning of the document, and the term "cat" appears at an offset of 300 words and again at an offset of 1,500 words from the beginning of the document, the offset values would be 100, 300, 1000 and 1500. Based on the length of the document, these "distances" may used to determine "relative distances." The relative distances may be combined using an equation similar to Equation 2 or transitively across links to determine a confidence value.

If the terms used to derive respective data elements are present in multiple sources, the confidence value determined for each of the sources may be used to determine a combined confidence value related to both data elements. In one example, the combined confidence value may be obtained by merging the confidence values from the different sources. By merging the confidence values for the same terms in various sources, the combined confidence value representative of data elements in multiple sources may be greater than the confidence value of any data elements individually. For example, if Cn is the confidence of data elements in the n-th document source, then C, the confidence of two terms being related, may be expressed as:

$$C = 1 - (1 - C1)(1 - C2) \ldots (1 - Cn) \qquad \text{Equation 2}$$

Confidence values determined based on the source, geographic nearness, 10 and/or semantic nearness, as well as any other confidence values, may be combined logically to provide a confidence value for a particular link associated with data elements derived from a particular source. The logical combination may be any form of derivation providing an indication of confidence, such as various logarithmic and/or probabilistic distributions. In one example, the logical combination may be a simple mathematical formula in which the first confidence factor is multiplied by the second confidence factor to arrive at a confidence value for the link or data element. The data element confidence factor of a link or data element may be used as a threshold to determine whether the link is valid, to determine the trustworthiness of a link data element, and/or for any other purpose.

Implied relationships between data elements can also be established with transitive reasoning and consideration of the confidence value(s). With transitive reasoning, implied relationships may be established between data elements based on parallel associations, or relationships, with other data elements. For example, a first data element may have a relationship with a second data element. A third data element may also have a relationship with the second data element. Depending on the nature of the relationships, transitive reasoning may be applied to establish an implied relationship between the first data element and the third data element.

Additional information may also be implied based on relationships between data elements. For example, a first data element may already have a relationship with a second data element, however only the first data element may include a geographic location. Based on both transitive reasoning and the existing relationship, an implied geographic location may be added for the second data element.

Factors may be used to determine whether two data elements associated 5 through one or more other data elements are related. The factors may include the validity of the existing relationship(s) based on the ontology or classification in which the association is made, the confidence of the links that lead to the implied association made with transitive reasoning, or any other factors that provide an indication of relatedness between data elements. As previously discussed, the ontology and classification is initially performed with the knowledge management tool. Thus, confidence values may be used when the data element database is being populated and links are being created in an automated fashion to also automatically create implied links. In addition, confidence values may be used when a link (either implied or direct) is manually added by a user.

Application of confidence values to determine if a transitive relationship should be established between data elements may be accomplished in many ways. In one example, with respect to the confidence of the links between data elements, the confidence value of relationships between associated data elements may be used as a factor to determine a confidence value for a proposed relationship. Only when the confidence value(s) for a proposed relationship exceeds a determined threshold may an implied relationship be established.

For example, a first data element (T1), a second data element (T2), and a third data element (T3) may be included in an example database. In this example, data element (T1) may be related to data element (T2) with a confidence value of 0.82, and data element (T2) may be related to data element (T3) with a confidence value of 0.71. Based on these confidence values, a confidence of the relationship between data element (T1) and data element (T3) may be (0.82)*(0.71)=0.58. To be considered a valid relationship, the value of confidence may be designated to be above a determined threshold, such as greater than 0.4.

Transitive associations made through more than two links or associations of data elements may be calculated similarly. For example, if data element (T3) is related to data element (T4) with a confidence of 0.50, then the relationship from data element (T1) through data elements (T2) and (T3) to data element (T4) may have a confidence rating of: (0.58)*(0.50)=0.35. If the confidence value is below the determined threshold, the link may be determined to not be a valid link. Alternatively, or in addition, links may be classified and stored in a number of categories based on the confidence value of the link.

If there are multiple relationship paths to reach a data element transitively, then a similar calculation to Equation 2 may be used. For example, if a link between data element (Ti) and data element (T4) has a confidence rating of 10 0.58 through data elements (T2) and (T1), and a link between data element (T1) and data element (T4) has a confidence rating of 0.38 through data element (T3), then the link between data element (Ti) and data element (T4) may have a total confidence rating of: $C=1-(1-0.58)(1\ 0.38)=0.74$. Note, for example, that if the threshold confidence level need to be 0.4 in order to consider a relationship valid, the link between data element (Ti) and data element (T4) would be a valid relationship, even though the relationship would not be valid if only the confidence value of the relationship between data element (T1) and data element (T4) through data element (T3) were considered (because 0.38 is lower than 0.40). As previously discussed, when multiple relationships are considered, the confidence value of the link between data elements may increase due to the compounding effect of the relationships.

Confidence values may also be used as a filter to eliminate information. For example, if a user is involved in an analysis that includes too much information, the confidence value may be raised to eliminate some portion of the data having lower confidence values, leaving only information with a higher confidence value associated therewith. If on the other hand, not enough information is being provided, the confidence value may be lowered to allow information with lower confidence values to be included in the analysis. In one example, a confidence threshold adjustment, such as a slider or a value entry, may be displayed upon request as a pop-up view. The user may adjust the confidence threshold to adjust the information currently being viewed. For example, where users want to represent a conservative versus more liberal understanding of a search result, the user may choose to limit the information to include only higher confidence information so as to present a higher likelihood of a more factual representation of the data and relationships. As the confidence threshold is lowered, more opportunities for analysis and potential distractions may appear.

Referring again to FIG. 2, the relationship builder module 210 enables the establishment of new actual or implied relationships between data elements. As previously discussed, a relational data element view and a geophysical view may display data element indicia, at least some of which indicate relationships therebetween. Due to the interactive nature and duplicative display of data element indicia in a different context in each of the views, previously unrealized relationships may become apparent. Such previously unrecognized relationships may be added with the relationship builder module 210.

The relationship builder module 210 may include an automated builder 15 component and a manual builder component. The automated builder component may automatically perform assessments of the corresponding data element indicia within the different views and identify potential relationships. The relationship builder module 210 may also perform automated analysis of such an identified potential relationship to determine if a relationship truly exists. Such automated analysis may include initiating analysis and obtaining confidence values from the confidence module 208, analysis of geographic location, relationship(s) through other data elements where relationships already exist, etc. In addition, the automated generation of links may be based on the geographic nearness, semantic nearness, text mining, data mining, or any other technique that allows automated recognition of the relationships between information that had not been previously identified.

Potential relationships may be evaluated based on determined criteria, such as user-entered parameters, thresholds, etc. When the relationship builder module 210 identifies a potential relationship, the potential relationship may be brought to the attention of a user for approval. Alternatively, the relationship may be created automatically. Such automatically created relationships may be distinctly identified as automatically created with a visual indication, and/or within the details associated with the relationship. However the relationship is created, relationship indicia indicative of the relationship may be depicted in the relational data element view. In addition, information may be transmitted to the data element database 122 (FIG. 1) that is indicative of the relationship and any data associated therewith.

The manual builder component of the relationship builder module 210 may allow a user to create a relationship between data elements using text-based linking of the data elements. Such text-based manual linking may also be created between a newly created data element and existing data elements. A user may choose to create such a relationship based on information obtained outside the knowledge discovery system, human intuition, analysis of the views, or any other factors. A user may also manually deploy the confidence module 208 to obtain confidence values, and/or manually initialize the automated builder component to evaluate identified data elements for a potential relationship.

When the manual builder component is enabled, a user may create such a relationship manually by identifying in any one of the views the corresponding data element indicia between which a relationship is desired to be established. Identification of the data element indicia may be by selection of the data element 20 indicia with a pointing device or via touch screen. Alternatively, the relationship may be identified by data entry, linking the corresponding data elements in a table, or any other mechanism for indicating a relationship between data elements.

Upon manual identification of a relationship via a text-based indication, the relationship may be visually indicated in one or more of the views. In addition, the relationship, and related information may be stored in the data element database 122 (FIG. 1). Such manually created text based relationships may be distinctly identified visually in the views, and/or in related data. Also, the confidence module 208 is enabled to perform analysis and automatically generate confidence values related to the newly created relationship.

The relationship builder module 210 may also cooperatively operate with the data element module 204 in the server 102 in order to enable the manual addition of new data elements to the data element database and to establish relationships with other existing or new data elements. In addition, information related to a relationship or, more generally, a data element may be added to the data element database with the relationship builder module 210.

The model module 212 may be enabled to perform additional analysis of the displayed views based on modeling parameters. Modeling parameters may include geophysical based modeling, and/or relational based modeling. Such modeling may be used to predict changes in relationships between data elements, geographic locations changes, etc. For example, a user may desire to model various aspects of the effects of ocean currents on sea animal migration by adding various currents in various locations on the geophysical view and viewing the changes in automatically created relationships among the sea animals as identified with the relationship builder module 210 in the relational data element view. In another example, a user may want to model a relationship between data element indicia representative of the sea animals in the relational data element view to determine the effect on the geographic location of the sea animals in the geophysical view.

Referring still to FIG. 2, the functionality of the user workstation 104 includes a multiple visualization integration engine 216, a display driver 218, and an export module 220.

In other examples, fewer or greater numbers of modules may be depicted to describe the functionality herein described.

The display driver 214 may be any form of functionality configured to drive a display the interactive view, and the various sub-views included therein. In one example, the display driver 214 may also include touch screen driver functionality. The multiple visualization integration engine 216 may be interfaced with the display driver 214 to provide display information thereto. The multiple visualization integration engine 216 may also receive user inputs via the display driver 214, such as mouse related inputs, touch screen inputs, etc.

The multiple visualization integration engine 216 may provide 30 interactive functionality of the various views in the interactive viewer. Thus, the overall functionality of the interactive view may be governed by the multiple visualization integration engine 216. In addition, the multiple visualization integration engine 216 may provide cohesive interactivity among the views, and reconciliation of the various views as adjustments, manipulations, and/or changes occur in any of the views. Cohesive interactivity among the views that involve the data elements may be based on the DEIDs associated with the data elements, the data element indicia, or any other mechanism for importing, exporting, and/or manipulating information to selectively maintain alignment of displayed information among the various views. The multiple visualization integration engine 216 also may interface with the scheduler module 202 via the network 106.

Communication with the scheduler module 202 may be in the form of requests transmitted from the multiple visualization integration engine 216 and responses transmitted from the scheduler module 202. The requests and responses may be data, audio, video, and/or any other form of information. Requests may include search requests, requests for updated views, requests for additional data related to the data element indicia displayed in the view(s), data retrieval requests, data storage requests, etc. Responses to the requests may include display data, view correlation/coordination information, data element related information, geographic information, relationship information, etc.

The multiple visualization integration engine 216 may also interface 20 with the export module 218. The export module 218 may provide an interface to one or more other devices to which information, such as display information, data element information, view cohesion information, or any other information may be exported. In addition, requests may be received by the export module 218. The requests may be based on user inputs to retrieve information from the databases to adjust information presented to a user, for example. Information may be accessed from any of the databases in the knowledge discovery system based on the DEIDs. In addition, requests to update, modify, add, or delete information related to a data element may also be received in a request and routed to the appropriate database based on the DEIDs and the information that is affected.

The export module 218 may operate with a push based model, such as that based on a subscription from a device(s) that is a receiver of the information, and/or with a pull based model, such as that based on a request received from a device(s) that is a receiver of information.

Figure 3:
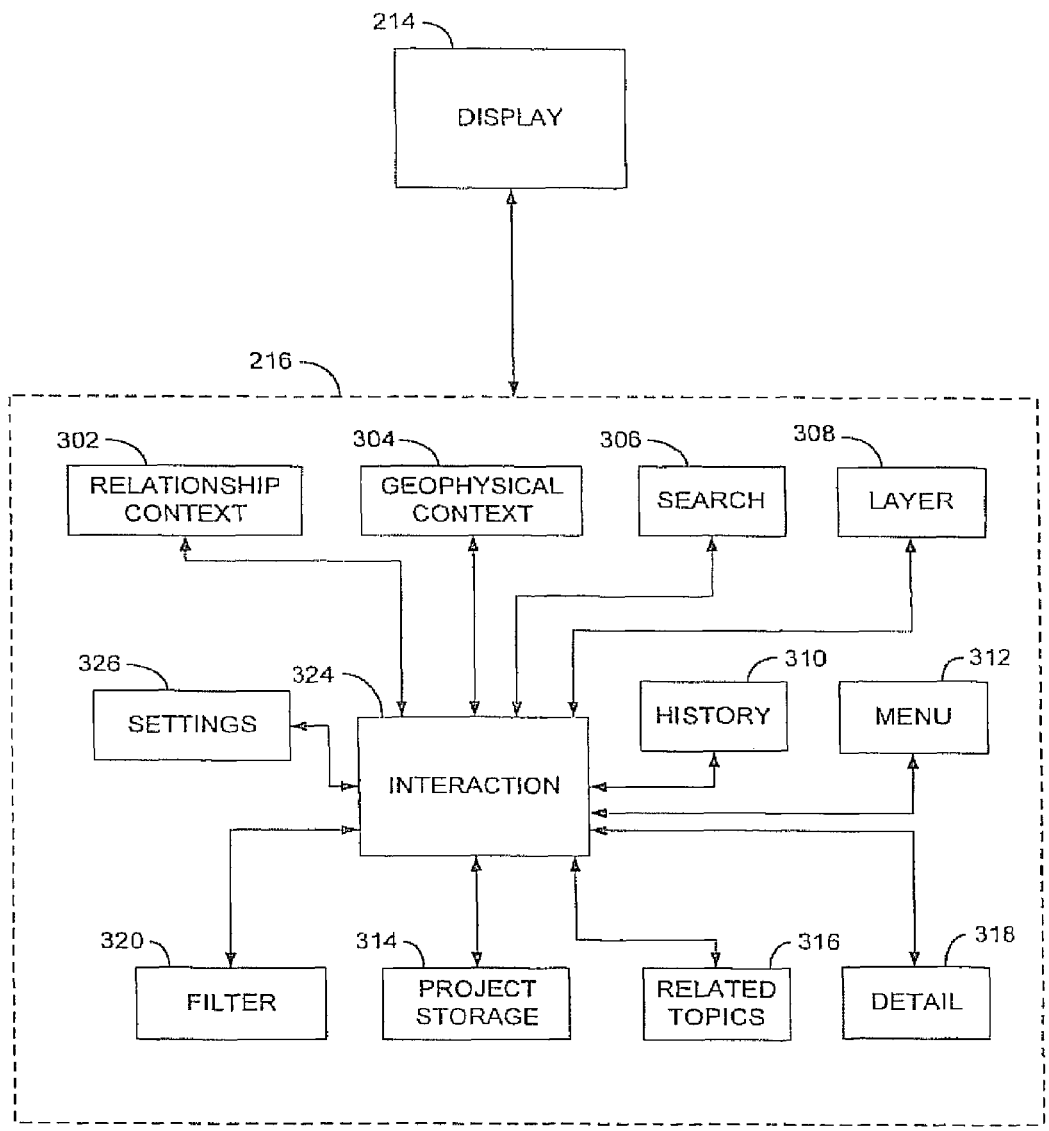
FIG. 3 is a block diagram of a portion of the functionality of the user workstation depicted in FIG. 2.

FIG. 3 is block diagram example of the functionality that may be present in the multiple visualization integration engine 216. The multiple visualization engine 216 may include a plurality of view tools. The view tools may enable generation/retrieval of data and interactive displays, provide interactivity functionality with users, provide data analysis and manipulation capability, etc. Accordingly, the view tools may include a listener capability to monitor for user inputs in a respective view, a request capability to generate requests for information in accordance with user inputs in the respective view, and a response receipt capability to translate or otherwise formulate responses into user receivable information, such as viewable subject matter for display in a respective view. The view tools may be selected for operation within the multiple visualization engine 216 by a user, by a system designer, and/or automatically based on the context in which a user is operating the knowledge discovery system.

Examples of view tools include a relationship context tool 302, a geophysical tool 304, a search tool 306, a layer tool 308, a history tool 310, a menu tool 312, a project storage tool 314, a related topics tool 316, a detail tool 318, and a filter tool 320. In other examples, any other form of view tools providing interactive view-based functionality may be included in the multiple visualization integration engine 216.

The relationship context tool 302 may govern and direct operation of the relational data element view. Accordingly, the relationship context tool 302 may display data element indicia, and relationship indicia. In addition, the relationship context tool 302 may enable and direct interactive adjustment of the relational data element view by a user. Interactive adjustment of the relational data element view may include use of the DEIDs associated with the data elements.

Figure 4:
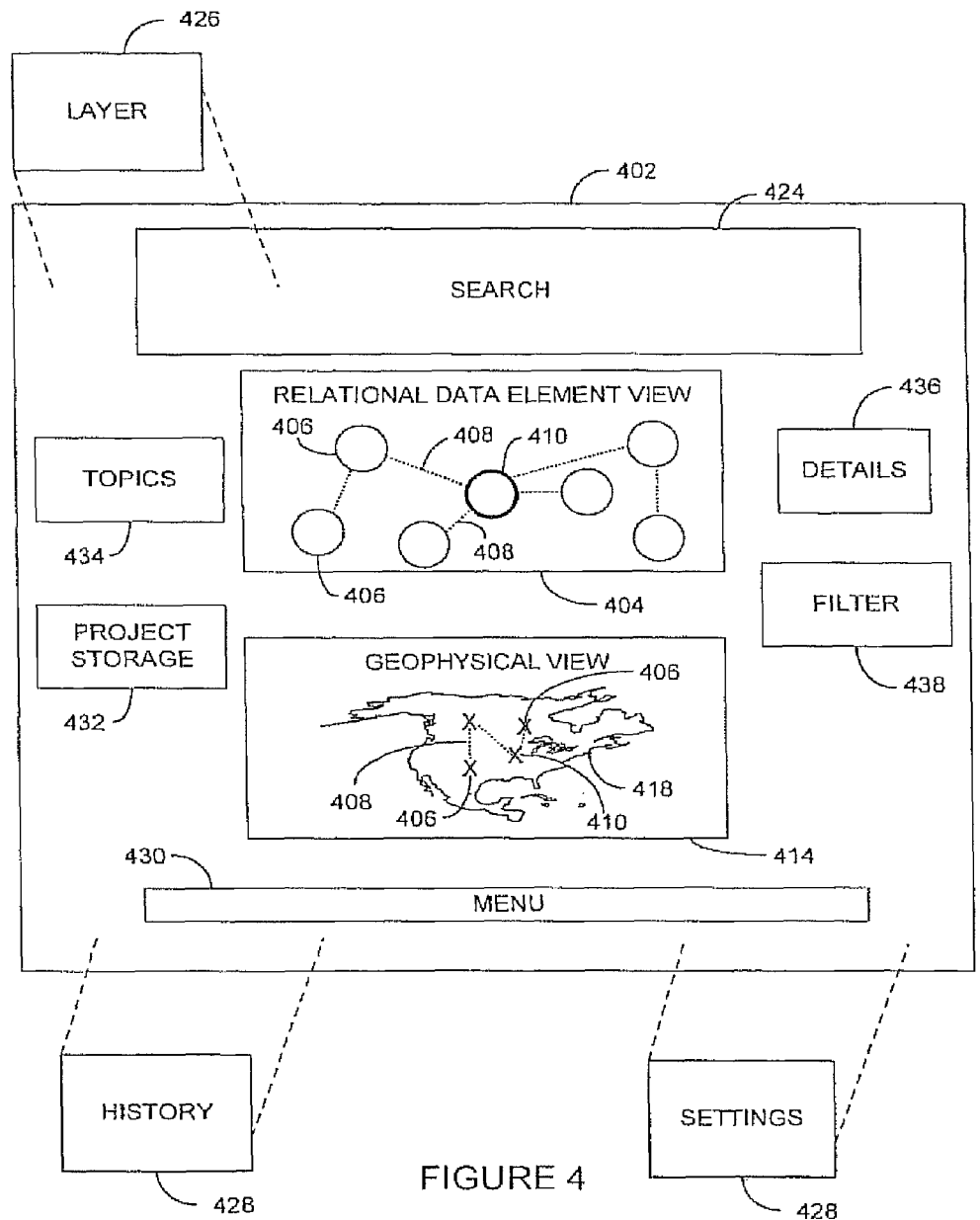
FIG. 4 is an example display generated with the knowledge discovery system illustrated in FIG. 1.

FIG. 4 is an example of an interactive view 402 that is displayable on a display. The interactive view 402 includes a plurality of sub-views included in the interactive view 402. The sub-views may be constantly displayed, pop-up views, and/or any other form of view. Each of the sub-views may be operated with a corresponding tool.

For example, the interactive view 402 includes an example of a relational data element view 404 governed by the relationship context tool 302 5 (FIG. 3). The relational data element view 404 may display a plurality of data element indicium 406 representative of data elements. The relational data element view 404 may also include a plurality of relationship indicium 408 representative of relationships between data elements. In addition, the relational data element view 404 may include one of the data element indicia as a focus data element indicia 410. The focus data element indicia 410 may be representative of a data element that is a focus of a search or analysis undertaken by a user, and the rest of the displayed data element indicium and relationship indicium may be related thereto and form a context.

During operation, when a user performs a search and selects a data element from the search, the selected data element may be displayed as the focus data element indicia 410 in the relational data element view 404. Other data element indicia 406 related to the selected data element may also be displayed, along with relationship indicia 408 indicating relationships. The relationship context tool 302 (FIG. 3) is responsive to user inputs to adjust the relational data element view 404, provide additional information related to the displayed data element indicia 406, and/or change the displayed data element indicia 406. For example, a user can select another of the data element indicium 406 to be the focus data element indicium 410, and the relationship context tool 302 may adjust the display accordingly.

Referring again to FIG. 3, the geophysical context tool 304 may direct population and interactive functionality related to the geophysical view. Thus, a geographical map and data element indicia associated therewith may be monitored, governed, and directed by the geophysical context tool 304. Similar to the relationship context tool 304, interactive adjustment of the geophysical view may include use of the DEID's associated with the data elements.

In FIG. 4, an example of a geophysical view 414 is depicted in the same interactive view 402 with the relational data element view 404. The geophysical context driver 304 may drive the geophysical view 414 to display a geographic map 418, and at least some of the data element indicia 406 displayed in the relational data element view 404. The geophysical view 414 also may include relationship indicia 408 and the focus data element indicia 410. Alternatively, driving the display to include the relationship indicium 408 and the focus data element indicia 410 may be omitted. Whatever the display details of the geophysical view 414, correspondence between at least some aspects of the relational data element view 404 and the geophysical view 414 may be cohesively maintained as the user manipulates, adjusts, and changes sub-views included in the interactive view 402. The correspondence of the different views may be maintained based at least-in part on the DEIDs.

Referring once again to FIG. 3, the search tool 306 may be any tool capable of searching for information based on search parameters provided by a user. For example, the search tool 306 may include search functionality to search the data elements database 122 (FIG. 1), the geographical database 120 (FIG. 1) and/or any other sources within the knowledge discovery system, and present results indicative of data elements. Such data elements may be selected for display in the relational data element view and/or the geophysical view. In addition, data elements identified with the search tool 306 may be selected for display with the other tools in the multiple visualization integration engine 216.

FIG. 4 includes an example of a search view 424. Within the search view 424, search terms may be entered by a user, and search results may be displayed. The search results may include data elements that are selectable by a user. Upon selection, an item identified as a search result may be displayed as a data element indicia 406 in the relational data element view 404 and/or the geophysical view 414 using the DEID of the corresponding data element. Selection by a user may involve dragging and dropping the displayed item into the relational data element view 404 and/or the geophysical view 414. Alternatively, a mouse click, touch screen, verbal command, written command, or any other selection mechanism may be used to direct the relationship context tool 302 (FIG. 3) and/or the geophysical context tool 304 (FIG. 3) to adjust the respective views.

The layer tool 308 illustrated in FIG. 3 may provide a layer functionality for the views generated with the relationship context tool 302, the geophysical context tool 304, or any other view displayable with a respective tool. The layers may be selectively arranged by a user with the layer tool 308 to further characterize the displayed information in one or more of the views. Available layers may be listed in a layer view 426, included in the interactive view 402, or may be accessed via some form of a pop-up view as illustrated in the example of FIG. 4. In addition, the layers may be selectively arranged to provide further search, information discovery, and insight capability. The addition and subtraction of layers may add information to one or more views and subtract information from one or more of the views. For example, a geophysical view may include layers of map data based on geocoded categories so that geographic features in a view may be added and removed by adding and removing layers.

Criteria to develop new layers also may be formulated manually by a user with the layer tool 308. For example, a user may select items within a particular view and enter a command to identify the selected items as part of a new 20 or existing layer. Alternatively, or in addition, all of the items in a particular view may be commanded by a user to be identified as a layer. Such commands may be entered by mouse click, selected from a menu, and/or any other mechanism.

In addition, data element indicia may be separated into layers based on category, source, relationships, and/or any other criteria to allow selective addition and removal of groups of data element indicia by a user from any one or more of the views. Further, the layer tool 308 may include layers of information related to the displayed data element indicia so that data element indicia may be displayed with varying amounts of related information dependent on the layers selected to be displayed. For example, an abbreviated title of a data element indicia may be included in a first layer, a fully descriptive title may be included in a second layer, and a source from which the data element indicia was derived may be included in a third layer. Accordingly, the layer tool 308 may provide a capability to visually filter information based on a context or semantics related to groups within the displayed information, as well as provide only that information that is desired.

In FIG. 3, the history tool 310 may be any recording functionality capable of storing activities performed in any one of the various views. Accordingly, the history tool 310 may provide a navigation history of how certain visual depictions were arrived at in one or more of the views. Storage of information collected by the history tool 310 may be in the memory of the server, and/or the user workstation. The information stored with the history tool 310 may include search queries, drag and drop of information among the various views, change of layers, changes in focus, changes in relationships, menu selections, and/or any other information related to manipulating information to arrive at particular views. Accordingly, a user may use "a trail of bread crumbs" approach to recreate movements/actions for purposes of recreating a particular result, training, etc.

The history tool 310 may operate a history view 428 within the interactive view 402, as illustrated in FIG. 4. The history view 428 may be a view within the interactive view 402, or may be a pop-up as illustrated. Using the history view 428, the history tool 310 may also allow a user to browse previous displayed geophysical views, relational data element views, search results, track progression of relationship linkages, etc. Accordingly, selection of history may automatically adjust one or more other views to reflect the selected history.

The menu tool 312 of FIG. 3 may provide the capability to select various tools for browsing, viewing, navigation history, search, creating relations, adjusting settings, changing views, etc., as described herein. For example, the menu tool may include a back selection functionality to revert to a previous view(s). In addition, the menu tool 312 may provide any other menu based functionality useable to administer and operate the various capabilities of the knowledge discovery tool, as described herein, and any other computer related menu based functionality. The menu tool 312 may operate a menu view 430, such as the example menu view 430 illustrated in FIG. 4. The menu tool 312 also may include view selection capability such that different menus may be available for different views. Thus, selection of a particular view, by mouse click, etc., may generate adjustment of the menu view 430 to display a menu that corresponds to the selected view.

In FIG. 3, the project storage tool 314 may provide the capability to display a listing or some other representation of various scopes of work undertaken by a user in a project storage view 432 (FIG. 4). The list may depict a plurality of folders and subfolders that may be expanded and contracted, such as, similar to Windows™ Explorer™. In addition, the project storage tool 314 may enable a user to store information related to each project on the server and/or the user workstation. In one example, the project tool storage 314 may provide a project view within the interactive view 402 that provides a visual indication of any number of projects which a user has stored. In addition to identification of one or more stored projects, the project storage tool 314 may also allow display and/or access to additional stored project related data, such as search information, relationship views, geophysical views, etc. Any other projected related information could also be displayed, retrieved and/or accessed from the project view tool 314.

The related topics tool 316 may be an automated capability to identify other information that may be of interest to the user based on how the user is interacting with the views. The related topics tool 316 may identify related information based on relationships between data elements, key words, and/or any other information. Identification of related topics may be in the form of a list of links to the related information that is selectable by a user, icons, or any other media indicative of related information.

As depicted in FIG. 4, the related topics tool 316 may provide a topics view 434 within the interactive view 402 that is updated with changing information as a user navigates, adjusts and otherwise interacts with the relational data element view and/or the geophysical view, for example. Retrieval of related information may occur at predetermined intervals, based on changes to the views being displayed, searches, manual entry of data, mouse-over of displayed information, and/or any other trigger related to the context in which a user is using the interactive viewer 402.

Referring again to FIG. 3, the detail tool 318 may provide additional information related to the information displayed in one or more of the views. As illustrated in FIG. 4, the additional information may be provided in a details view 436 within the interactive view 402, and/or as a separate pop-up view. Initiation of the display of additional information on a selected topic may be based on selection of an item, such as a data element indicium, a mouse over of an item, user entry of a term, or any other criteria. The additional information to be displayed may be predetermined based on user settings, a context of the analysis, a data element for which the information is being accessed, or any other data selection criteria. For example, a source from which a data element is derived may be depicted in the details view 436. As illustrated in FIG. 3, a request for additional information related to selection of an item may be generated with the detail tool 318 and transmitted to the server. The detail tool 318 may also receive a response and provide a view of the information included in the response. In the example of depiction of a source in the details view 436, the source may be obtained and displayed based on a link stored in one of the databases, or alternatively, the source itself may be stored in the knowledge discovery system for access and display.

The filter tool 320 may provide filtering of data displayed in the various views. Filtering may be based on confidence values, categories of data elements, relationships, etc. In addition, or alternatively, filtering may be data specific, based on searches, views, etc. The filtering also may be based on user inputs, the data being displayed, or any other information. Application of one or more filters may allow a user to control one or more of the views included in the interactive view 402 by selectively removing information. Accordingly, the process of applying filter parameters is a subtractive process in one or more of the views. The filter parameters may be selected/entered within a filter view 438. The filter view 438 may include display of a plurality of previously stored filters that are selectable by a user. Alternatively, or in addition, the filter view may allow a user to select parameters to include as filter criteria in a new filter. Once generated! selected, the filter(s) may be applied to one or more of the views via drag and drop, menu selection, or any other user-directed mechanism.

As depicted in FIG. 3, the multiple visualization integration engine 216 may also include an interaction module 324 and a settings module 326. The settings module 326 may deploy, store, and maintain user settings related to the interactive view, the sub-views within the interactive view, the tools, or any other settable parameters within the knowledge discovery system. Thus, settings within the settings module 326 may be applied to the operation of the tools associated with the various views, portions of the interactive view, and/or the entire interactive view. Settings may be depicted in a settings view 440 within the interactive view 402 (FIG. 4). As depicted in FIG. 4, the settings view 440 may be a pop-up view, or any other form of sub-view.

The interaction module 324 may monitor each of the views within the interactive view 402 and provide coordinated changes of the information displayed to maintain correlation between the various views. Such coordinated changes may be based on changes by a user or any other event that affects the information displayed in one of the views. The interaction module 324, based on the event, may trigger changes in the information presented in another view as part of maintaining correlation among the views. Changes among the different views may be implemented using the DEIDs of the data elements, or any other commonality identifier of information among the different views. Accordingly, the views may be cohesively maintained to correspond and/or correlate with one or more of the other views within the interactive view 402.

The interaction module 324 may include a monitor capability that monitors each of the tools corresponding to the displayed views. When a tool generates a request, and/or receives a response, the interaction module 324 may automatically generate an alert or adjustment instruction to the remaining tools that is indicative of the information in the request or response. In addition, the alert or adjustment instruction may include the DEIDs of any data elements affected by the request/response. Based on the alert, the tools may selectively generate requests of their own to correspondingly update their respective views to maintain coordination and alignment with the view from which a request or response was initiated.

The interaction module 324 may also enable adjustment of other views based on user commands that are related to a view. For example, a user may select a data element indicium in one view and enter a command to depict/adjust/remove the same data element indicium in another view. Using the DEID of the data element, the interaction module 324 may carry out the command. Also, the interaction module 324 may enable the same information in multiple views to be identified when that information is selected in any one of the views. For example, if a data element indicium in one view is selected, depiction of that data element indicium in one or more other views may be identified, such as by highlighting using the DEID of that data element.

The interaction module 324 may also be responsive to a tracking setting that is settable within the settings module 326. The tracking setting may enable and disable automatic adjustments of corresponding views to maintain cohesiveness. The tracking setting may be enabled or disabled for each of the tools/views operable within the interactive view 402. Accordingly, any particular view can~be locked, or allowed to automatically cohesively adjust in order to maintain coordination with other views in the interactive view 402.

The settings module 326 may also include settings related to individual views. For example, a fix boundaries setting may be associated with the geophysical view such an outer boundary of a geographical view may be disabled from adjustment when the fix boundaries setting is enabled. Accordingly, automated zoom and pan adjustments with the geophysical context tool 304 based on the currently displayed/selected data element indicium may be suspended. In another example, adjustment of the focus in the relational data element view may be disabled with a setting in the settings module 326. In other examples, settings to curtail or only allow certain types of adjustments in the views may be included in the settings module 326. Other example settings included in the settings module 326 may include user display preferences related to one of more of the views, view arrangement preferences, alert and pop-up related preferences, drag and drop related preferences, mouse-over data display preferences and/or any other user preference related settings that involve the views or operation of the respective tools.

Figure 5:
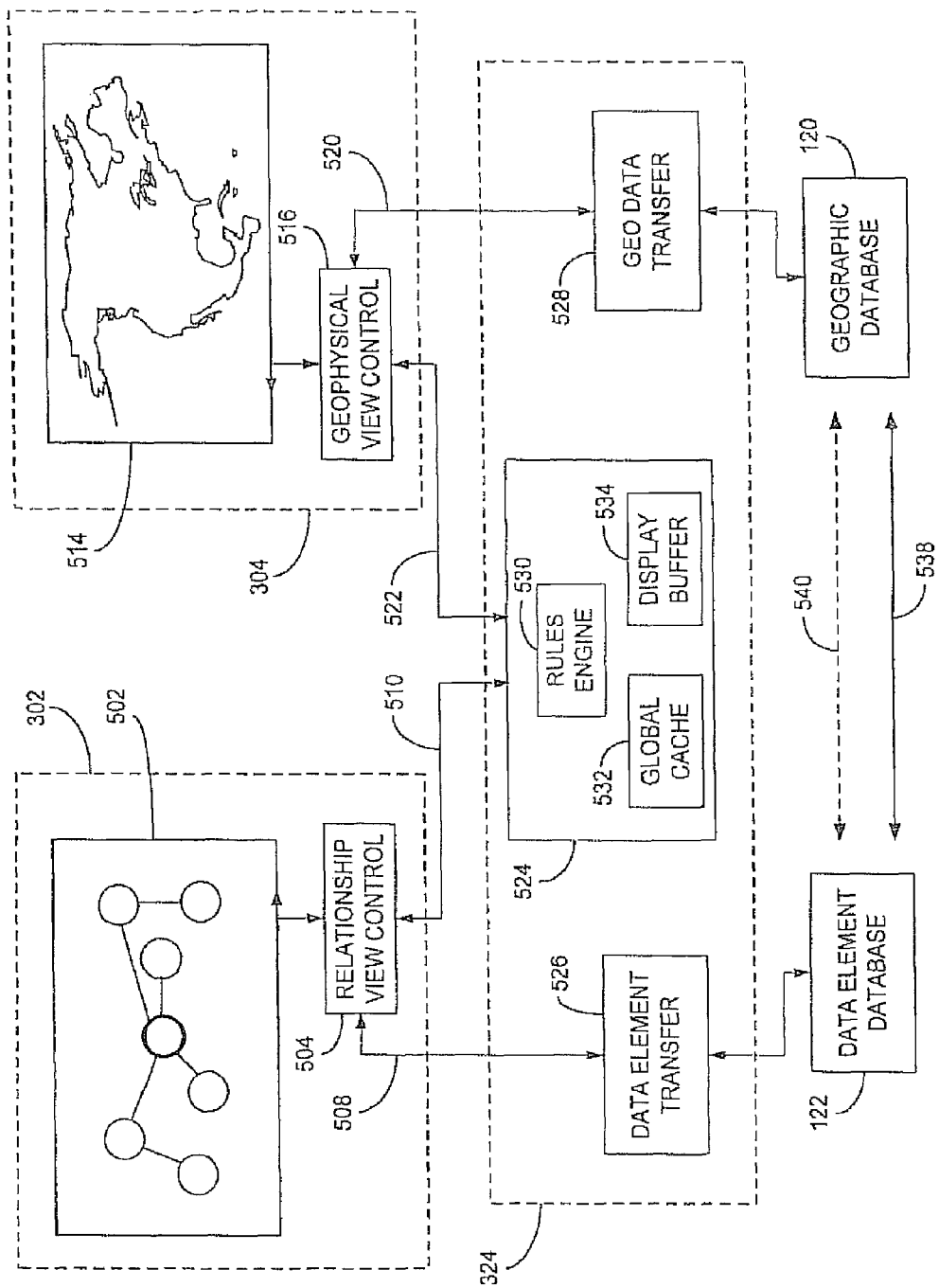
FIG. 5 is block diagram illustrating an example of some of the functionality of the knowledge discovery system illustrated in FIG. 1.

FIG. 5 is a block diagram illustrating an example of the interactive operation of the relationship context tool 302, the geophysical context tool 304, the interaction module 324, the geographic database 120, and the data element database 122. In other examples, additional tools could be illustrated and discussed to describe the functionality of the interactive operation of other tools and/or modules.

The relationship context tool 302 includes a relationship context driver 502 and a relationship view control 504. The relationship context driver 502 may drive the relational data element view 404 to display data element indicium representative of data elements, relationship indicium 408 representative of 15 relationships between data elements, and the focus data element indicia 410 to form a context as previously discussed with reference to FIG. 4. The relationship context driver 502 may be responsive to user inputs related to the displayed items. Selections with a pointing device, touch screen inputs, mouse-overs, drag and drop actions, data display requests, such as a right mouse click, and/or any other user-initiated inputs may be sensed with the relationship context driver 502.

The relationship view control 504 is coupled with the relationship context driver 5~02 and forms an interface with the interaction module 324. The relationship view control 504 operates as a listener that monitors for changes in the relationship context driver 502. Upon receipt of an indication of a user input, a request may be generated and transmitted to the interaction module 324 on a response/request line 508. The request may be a request for information to adjust the display based on a received user input, and may include one or more DEIDs of the affected data elements. In addition, the relationship view control 504 may generate an input adjustment message indicative of the adjustment on an adjustment line 510. The input adjustment message may include one or more DEIDs. Any adjustment of the relational data element view 404 (FIG. 4) may be formulated into an input adjustment message and transmitted to the interaction module 324 on the adjustment line 510.

The geophysical context tool 304 includes a geophysical context driver 514 and a geophysical view control 516. The geophysical context driver 514 may drive the geophysical view 414 to display the geographic map 418 and at least some of the data element indicium 406 as discussed with reference to FIG. 4. The geophysical context driver 514 may be responsive to user inputs related to the displayed items. Selections with a pointing device, touch screen inputs, mouseovers, drag and drop actions, data display requests, such as a right mouse click, and/or any other user-initiated inputs may be sensed with the geophysical context driver 514.

The geophysical view control 516 is coupled with the geophysical context driver 514 and forms an interface with the interaction module 324. The geophysical view control 516 operates as a listener that monitors for changes sensed with the geophysical context driver 514. Upon receipt of an indication of a user input, a request may be generated and transmitted to the interaction module 324 on a response/request line 520. The request may be a request for information to adjust the display based on a received user input, and may include one or more DEIDs of the affected data elements. In addition, the geophysical view control 516 may generate an input adjustment message indicative of the adjustment on an adjustment line 522. The input message may include one or more DEIDs. Any adjustment of the geophysical context view 414 (FIG. 4) may be formulated into an input adjustment message and transmitted to the interaction module 324 on the adjustment line 522.

The interaction module 324 may include a master visual controller 524, a data element transfer module 526, and a geo data transfer module 528. In other examples, fewer or additional modules may be used to depict the functionality of the interaction module 324, as herein described.

The master visual controller 524 may maintain coordination between the 30 relationship context tool 302 and the geophysical context tool 304 by receiving adjustment events on the adjustment line 510 or 522 from one of the tools, and by pushing corresponding adjustment instructions to the other tool on the adjustment line 510 or 522. Accordingly, the master visual controller 524 may automatically and substantially continuously reconcile the relational data element view 404 and the geophysical view 414 (FIG. 4). Alternatively, reconciliation of the views may be based on a determined interval or schedule, such as every 10 seconds, or based on a manually input user command. Reconciliation of the views may be maintained based on the DEIDs of the data elements represented in the views.

The master visual controller 524 may include a rules engine 530. The rules engine 530 may include a set of rules that correlate adjustment events with adjustment instructions. Thus, upon receipt of an adjustment event, the rules engine 530 may determine the corresponding adjustment instruction to be pushed out. Adjustment events and corresponding adjustment instructions may involve identification of the data elements using the DEIDs. For example, the relationship view control 504 may send an adjustment alert over the adjustment line 510 indicating with a DEID that one of the data element indicia has been selected to be the focus indicium. The rules engine 530 may identify a corresponding adjustment instruction to remove highlighting from one data element indicium, and add highlighting to the data element indicium shown in the geophysical view that is associated with the DEID selected to be the focus indicium. Thus, in response, the master visual controller 524 may transmit a corresponding adjustment instruction that includes the DEID on the adjustment line 522 to the geophysical control 516. The adjustment instruction may direct the geophysical view control 516 to update the data element indicia shown on a geographic map to indicate the newly selected focus indicium.

The master visual controller 524 also includes a global cache 532 and a display buffer 534. The global cache 532 may be a temporary storage of data related to the information currently displayed in the relational data element view 404 and geophysical view 414 (FIG. 4). The cached data may include data from both the data element database 122 and from the geographic database 120, and may be associated with the DEIDs. Thus, when more information is needed, such as when a user requests something from either the relational data element view, or the geophysical view, the information may be more efficiently retrieved from the global cache 532, instead of less efficiently retrieved from the respective database. In one example, the global cache 532 may store all the information related to that currently being displayed in the views, plus an additional 25% representative of the data elements that surround or are adjacent to the current view in the content being displayed.

The display buffer 534 may be any mechanism or device that stores the information currently being displayed in the interactive view 402 (FIG. 4). The currently displayed information may be displayed in a table form in the display buffer 534. Updates to the information in the display buffer 534 may be based on adjustments in the views, a predetermined time interval, and/or any other criteria. Information stored in the display buffer 534 may also be stored in association with a corresponding DEID.

Due to the global cache 532, the adjustment instructions generated with 15 the master visual controller 524 may include data retrieved from the global cache 532 with instructions to adjust the display to include the retrieved data. Alternatively, or in addition, the adjustment instructions may be a request to obtain information from a respective database, since at least part of the information to complete the adjustment was not available from the global cache 532. Adjustment instructions generated with the rules engine 530 that result in a database request are adjustment instructions that do not include information (or include only partial information) from the global cache 532. The database requests may identify the data elements related to the request with the DEIDs of the data elements. The display buffer 534 may store that which is actually being displayed in the relational data element view 404 and the geophysical view 414 (FIG. 4). Thus, as the views change, the display buffer 534 may be updated with information from the global cache 532.

The data element transfer module 526 and the geo data transfer module 528 may receive respective requests from the relational view control 504 on the response/request line 508, and the geophysical view control 516 on the response/request line 520. The requests generated by the relational view control 504 may be based on adjustments sensed with the relationship context driver 502, and requests generated by the geophysical view control 516 may be based on adjustments sensed with the geophysical context driver 514. In addition, the requests may be based on adjustment instructions generated with the rules engine 530 to reconcile the relational data element view with the geophysical view, or the geophysical view with the relational data element view.

The data element transfer module 526 and the geo data transfer module 528 may include a data translation capability to convert a request received from the respective relational view control 504 or the geophysical view control 516 to a format compatible with the respective data element database 122 or the geographic database 120. Also, the data element transfer module 526 and the geophysical data transfer module 528 may include a data translation capability to convert a response received from the data element database 122 to be compatible with the relational view control 504 and a response received from the geographic database 120 to be compatible with the geophysical view control 516. The data element transfer module 526 and the geo data transfer module 528 also may format requests and responses to be compatible with the receiver of the requests and responses. Not only may requests be formatted, but in the case of responses, both the information being provided and the response itself may be formatted. Alternatively, where data translation is unneeded, the data element transfer module 526 and/or the geo data transfer module 528 may be omitted.

The master visual controller 524 may maintain coordination between the relational data element view 404 and the geophysical view 414 by also maintaining coordination between the data element database 122 and the geographic database 120. Each of the data elements maintained in the data element database 122 may have an explicit connection with the geodata included in the geographic database 120 as illustrated by a solid arrow line 538. The explicit connection may be in the form of the data element identifier (DEID). As previously discussed, the DEID is a unique identifier for each of the data elements. Accordingly, each of the data elements included in the data element database 122 may be associated with a respective DEID that is also associated with information related to the same respective data element in the geographic database 120.

In one example information for each of the data elements included in the data element database 122, may stored in a respective record. Each record may include a plurality of fields. The Fields included in each of the records may include the DEID that is unique to the data element represented with the record, and at least one category that provides a context for the data element. In addition, the record may include other fields, such as a name, a label, a description, at least one relationship indicator, and any other information to be associated with a particular data element. For example, priorities, confidence(s), data history, source information, etc. could be included in a data record.

The geographic database 120 may also include records related to each of the data elements. Each of the records in the geographic database 120 may include the DEID, a latitude/longitude indicative of a geographically based location, and at least one category that provides a context for the position information of each of the data elements. If a data element does not have a location associated therewith, the latitude and longitude may be null. Each of the records may also include a description of the geographic location and any other geographically related information associated with the data element identified with the DEID.

The DEIDs may also be associated with multiple geographic locations, each with a different category providing a context. For example, a DEID may be broken down into a plurality of sub DEIDs each with a different location and category. Thus, dependent on the category, a corresponding location may be extracted from the geographic database 120 and displayed in the geophysical view 414 (FIG. 4).

The data element database 122 and the geographic database 120 may also include implied relationships as illustrated by a dotted arrow line 540. The implied relationships may be based on relationships between the data elements described in the records of the data element database 122, as previously discussed. Due to the use of the DEIDs in both the geographic database 120 and the data element database 122, the implied relationships are also implicitly present in the geographic database 120. Inherently, the DEIDs in the geographic database 120 also may include geographically based relationships due to their geographic locations. Thus, data relationships and geographic relationships may be cohesively displayed applied and manipulated by a user based on the DEIDs and the coordinated interactive application of the data from the geographic database 120 and the data element database 122 to the relational data element view and the geophysical view.

Figure 6:
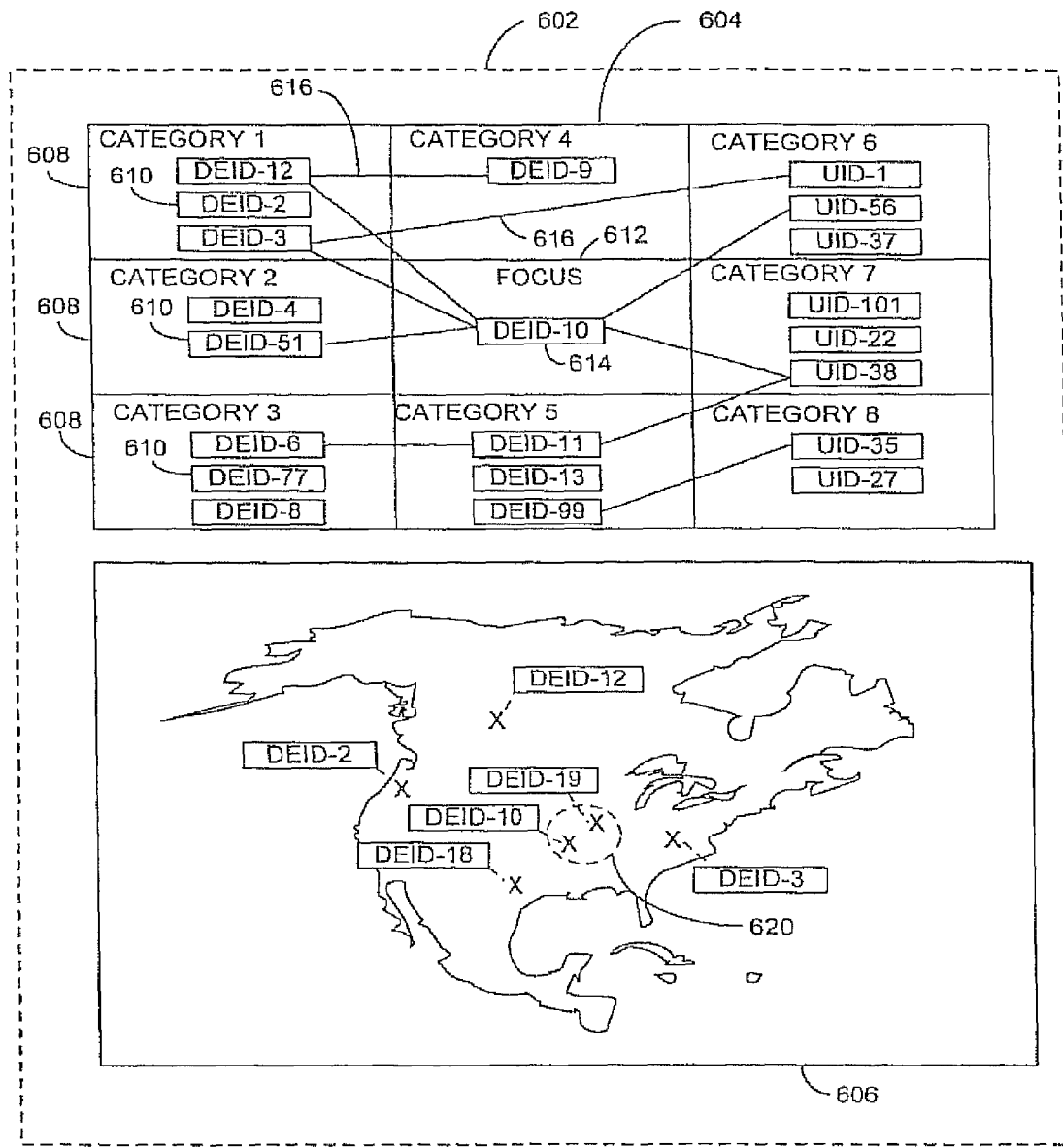
FIG. 6 is another example display generated with the knowledge discovery system illustrated in FIG. 1.

FIG. 6 is an example of an interactive view 602 that includes a relational 10 data element view 604 and a geophysical view 606. In the relational data element view 604, a plurality of zones 608 that form a context may be displayed. Each of the zones 608 may represent a category within the overall context of the information being displayed. Within each of the zones 608, one or more data element indicia 610 may be displayed. In the illustrated example, nine zones are depicted. In other examples, any number of zones may be included in the relational data element view 604. In addition, in other examples, the zones may be omitted, and any other form of data visualization may be used to visually depict the information. An example of a view that includes zones is described in U.S. Pat. No. 6,996,774 issued Feb. 7, 2006, which is herein incorporated by reference in its entirety.

Each of the data element indicia 610 that are illustrated include indication of the DEID that is unique to a data element being represented by a respective data element indicium 610. The data element indicia 610 may be displayed within a particular zone 608 representative of a category included in the records of the respective data elements that are associated with the context being displayed. One of the zones 608 is a focus zone 612. The focus zone 612 may include a focus data element indicium 614, and describe a category of the focus element indicia for the particular context being displayed. Although depicted as being centrally located in the illustrated example, the focus zone 612 and/or focus data element indicium 614 may be positioned anywhere within the relational data element view 604. Some of the data element indicia 610 may also include relationship indicium 616 indicative of relationships between data elements as described in the respective records of the data elements.

As previously discussed, the relational data element view 604 may be adjusted and manipulated by a user. Adjustments may be direct adjustments, such as adding a new relationship, changing the focus zone 612, or changing the focus data element indicium 614. In addition, indirect adjustments based on adjustments or manipulations in the other views, as previously described, are possible.

The illustrated geophysical view 606 includes a geographic map. Displayed on the geographic map may be indicia representative of at least some of the data element indicia 610 displayed in the relational data element view 604. In the illustrated example, representation of the focus data element (DEID-10) and the data element indicia from the zone 608 identified as "CATEGORY 1" are depicted (DEID-12, DEID-2, and DEED-3). Also depicted are two additional date elements (DEID-18 and DEID-19) that are not depicted in any category in the relation data element view 604, but are geographically nearby the focus data element 614. Thus, the two additional date elements (DEID-18 and DEID-19) may be displayed based on a geographical relationship with the focus data element indicium 614.

The two additional date elements (DEID-18 and DEID-19) may not be linked with the data element indicia 610. The display of the additional data elements (DEID-18 and DEID-19) may be based on user manipulation of search results, filtering, and/or any other tools, as previously discussed, and may represent previously undiscovered information relevant to the focus data element indicium (DEID-10) that was identified. Thus, the two additional date elements (DEID-18 and DEID-19) are illustrative of previously unknown related information that was identified without a significant (or any) confidence value that warrants display in the relational data element view 604. Accordingly, depiction of the additional data elements (DEID-18 and DEID-19) are illustrative of how the coordinated use of combination of the relational data element view 604, the geophysical view 606, and any additional information using, for example, mouse clicks, mouse-overs, menus, etc. as previously described, may be accessed from these views, and may be used to determine relevancy of information.

The geophysical view 606 may also provide the capability to identify relationships between displayed data element indicia in the context of the currently displayed information. Identification of relationships may be performed using the relationship builder module 210 (FIG. 2) as previously discussed. Identification of implied relationships may be based on proximity, a nearness consideration, confidence values, or any other information, as also previously discussed.

A determination of geographic proximity may be based on a distance 10 boundary indicator 620. The distance boundary indicator 620 may be requested by a user and implemented with the relationship context tool 302 (FIG. 3), using, for example, a pointing device on the geophysical view 606. The size and shape of the distance boundary indicator 620 may be adjustably selected by the user. Thus, the shape of the generated boundary indication may be square, round, octagonal, freehand, or any other geometric or non-geometric shape. The distance boundary indicator 620 may be initiated to create a request to return information from the database(s) on all items within the distance boundary indicator 620. Returning all items within the distance boundary indicator 620 may be used to identify items, such as data elements that are within geographic proximity. Such data elements, which were not previously linked, may be identified and linked based on geographic proximity of the data element indicia in the geophysical view 414. Based on analysis of the distance boundary indicator 620, the user may create a relationship using, for example, a pointing device on the geophysical view 606.

Geographic proximity also may be used semantically to enhance and/or bolster analysis related to knowledge discovery and relationship discovery. Semantic geographical descriptors may be used to descriptively and categorically describe geographic relationships between data elements. The semantic geographical descriptors may descriptively define distances with terms such as: near, far, close-to-waypoint, shortest, etc. These semantic geographic descriptors may be utilized by a user during analysis to filter, categorize or otherwise constructively modify the context of one or more of the views by enabling a user to semantically query, retrieve, and relate physical locations with other physical locations and relationships.

Semantic geographic descriptors may be established automatically or manually. In one example, semantic geographic descriptors may be pre-defined and applied automatically based on rules or other logic at the time a data element is derived, when a search is performed, when a view is populated, or at any other time. In another example, semantic geographic descriptors may be associated with the geographic proximity of data elements encompassed with the distance boundary indicator 620. For example, when a distance boundary indicator 620 is applied to the geophysical view 606, predefined semantic geographical descriptors may be automatically applied within the distance boundary indicator 620 based on predefined rules. Such predefined rules may operate based on physical distance, differences in location coordinates, proximity with respect to a geographic location, such as in a city or town, or any other determination related to geographic location. The semantic geographical descriptors may be associated with those data elements represented with data element indicia falling within the distance boundary indicator 620. Alternatively, a user may select and manually indicate semantic geographic descriptors based on application of predetermined definitions to the data element indicia being displayed, and/or within the distance boundary indicator 620.

Figure 7:
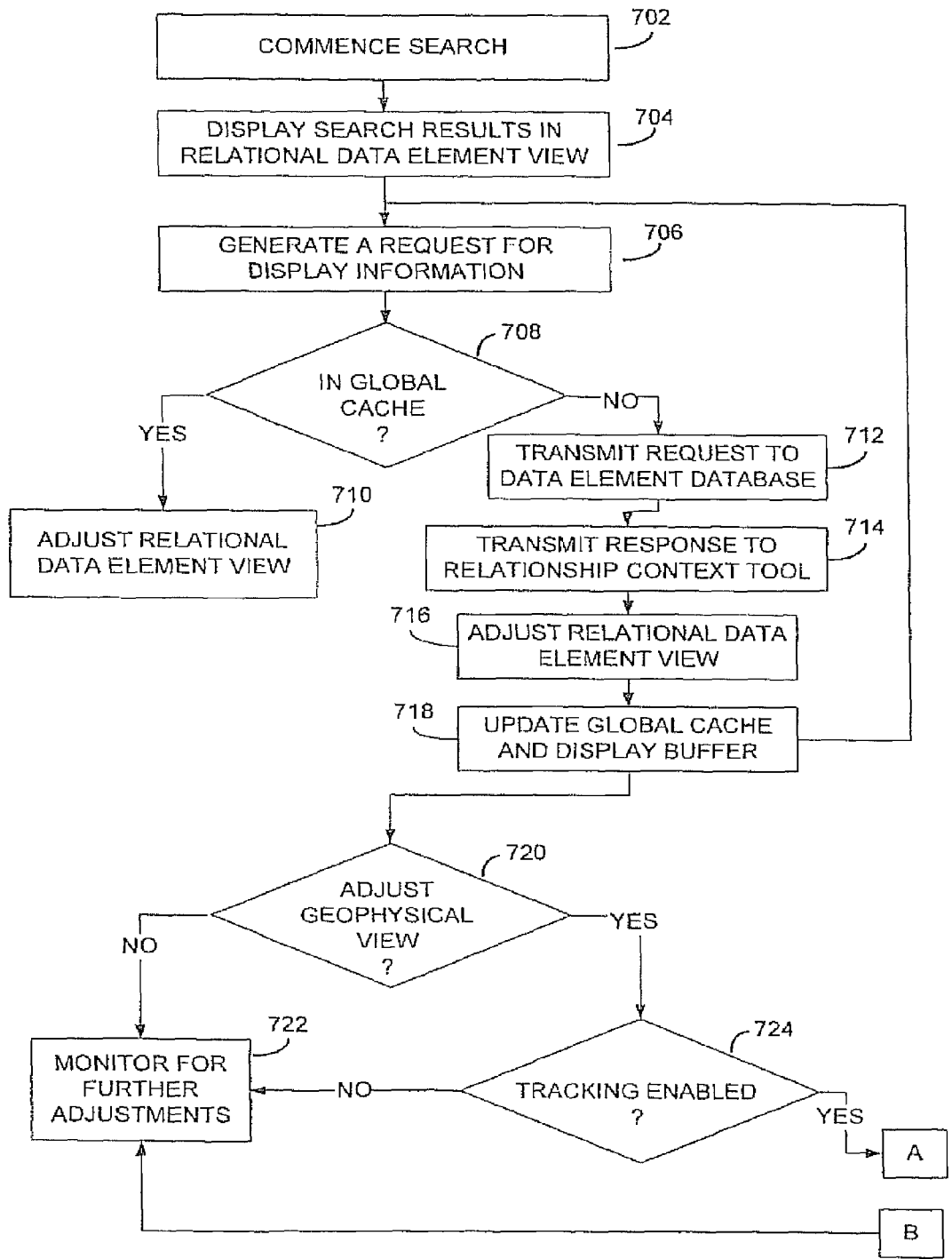
FIG. 7 is an operational flow diagram depicting example operation of the knowledge model discovery system illustrated in FIG. 1

FIG. 7 is a process block diagram of example operation of the knowledge discovery system described with reference to FIGS. 1-6. At block 702, a user may commission a search for a topic of interest in the search view 424 of 25 the interactive view 402. The search commissioned by a user may be in the form of a deductive analysis, where the user has a target subject that the search is centered on. For example, a deductive analysis may involve a search for information related to a particular person who is a known terrorist. Thus, the search may be conducted based on the individual's name, social security number, or other unique personal information, and may be conducted in the context of a search for people. Other categories related to the search may include information related to the person, such as employers, vehicle registrations, etc. Based on data relationship information, and geographic information and associations therebetween, additional information may be uncovered.

Alternatively, the search may be an inductive analysis in which the 5 search is for subject matter related to a topic, such as, a search for a bomb maker based on a large number of bombings that occurred along a particular street. In this example, data relationship links and geographic information and associations therebetween may provide an indication of terrorist groups or individuals involved in such activities.

The user may elect to have one of the search results displayed in the relational data element view 404 at block 704. Selection may be based on dragging the selected search result from the search view 424 to the relational data element view 404, for example. At block 706, the relationship context driver 502 may sense the addition of the search result, and the relationship view control 504 may generate a request for information. The information may include one or more DEID(s) related to the selected search result and any other information related thereto. Thus, the selected search result may include a plurality of data elements, and their related information dependent on the context of the search.

The context of the search may be specified manually as one of the 20 search parameters during a search. For example, the user could manually enter, or select a subject area/context from a drop-down list prior to commencing a search. Alternatively, or in addition, the context may be determined automatically by the knowledge discover system. Automatic determination may be based on user settings, user preference, predictions based on previous searches, frequency at which the search results are displayed, or any other parameters. In addition, automatic determination of a context may be enabled based on verification by the user of the need to generate/consider the context.

In one example, the context of a search may by automatically determined by the rules engine 530 based on predefined rules stored therein. Within the rules engine 530, rules may be defined for the rendering a search results context view. The rules may specify the order of importance for relationships between categories and data properties returned in the search results. The presence of important relationships and properties in the search results combined with the amount of related information may be encoded or otherwise identified in the context of a length of a path connecting the search data element(s) to the result data element(s). These path length parameters may be empirically determined to limit erroneous links between data elements. The resulting connection paths, or path length parameters, may be used to determine the layout and population of a view, such as the geophysical view 414. Results with higher importance and greater path length may be displayed first and/or with higher priority.

At block 708, it is determined based on the DEID(s) if the requested information needed to populate the relational data element view is cached in the global cache 532. If yes, the information is extracted from the global cache 532, stored in the display buffer 534, and the relational data element view 404 is adjusted via the relationship view control 504 and the relationship context driver 502 at block 710. If all or some portion of the requested information is not available from the global cache 532, a request for whatever information is missing is transmitted via the data element transfer module 526 to the data element database 122 at block 712. For example, the focus data element from the search result (and related information) may be missing from the global cache 532. Thus, the DEID of the focus data element is included in the request.

At block 714, a response may be generated and transmitted to the relationship context tool 302 via the data element transfer module 526. As previously discussed, depending on the nature of the request, related information in addition to what is used for display may be included in the response. Accordingly, in this example, a focus data indicia, relationships related thereto, data record fields for the focus data element, and any other related information may be provided in the response. In addition, since the global cache 532 is configured to include surrounding information, other data element indicia relationally surrounding the focus data element may also be included in the response.

The response may be parsed by the relationship view control 504, and provided to the relationship context driver 502 to update the relational data element view at block 716. In addition, at block 718, the global cache 532 and the display buffer 534 may be updated, and the operation may adjust the relational data element view 404 to display the search results. As previously discussed, the global cache 532 may be updated with the data elements requested, nearness-related data elements, relationship-related data elements, and all related information. The display buffer 534, on the other hand, may be updated with only that information currently being displayed. All information may be added and/or updated based on the DEID's.

Figure 8:
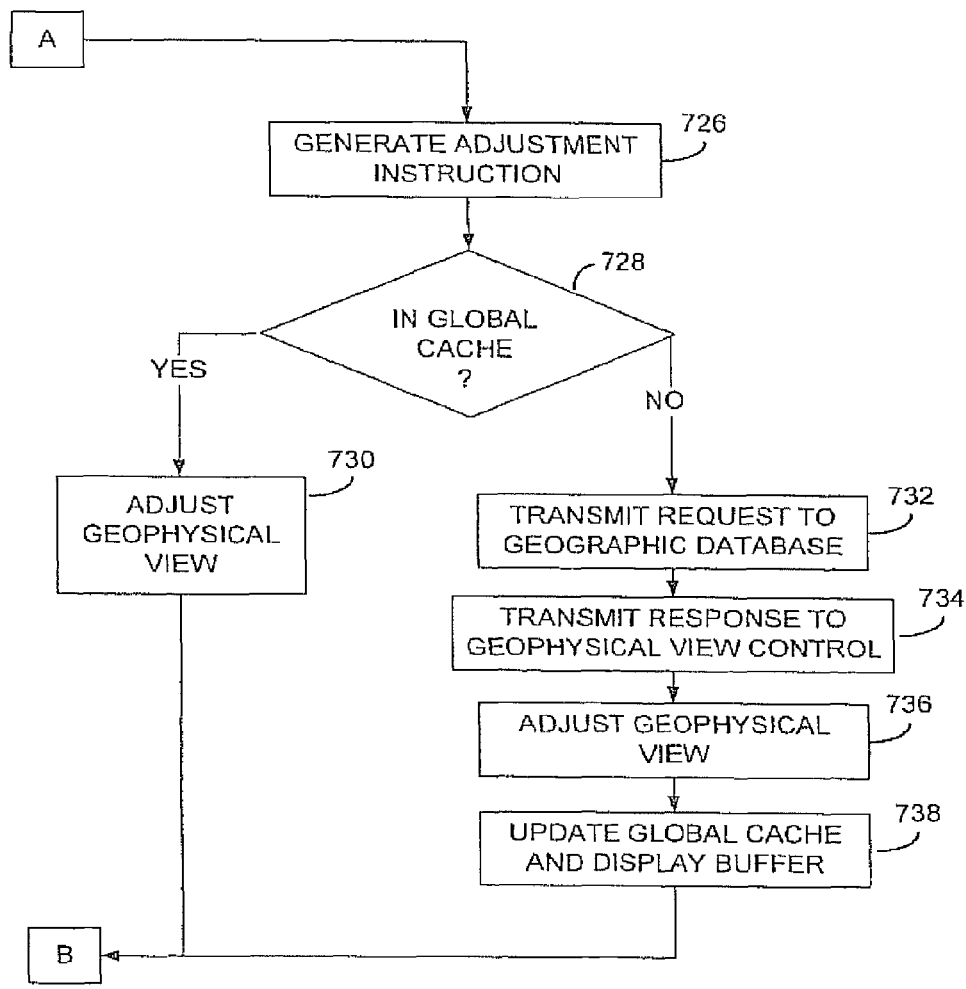
FIG. 8 is a second portion of the operational flow diagram of FIG. 7.

It is then determined with the rules engine 530 if an adjustment to the geophysical view 416 is warranted based on the adjustment to the relational data element view 404 at block 720. If no adjustment is necessary, the relationship context tool 302 and the geophysical context tool 304 monitor for adjustments to the relational data element view 404 and the geophysical view 416, respectively, at block 722. If at block 720 adjustment is necessary, it is determined if tracking is enabled for the geophysical view at block 724. If not, the operation proceeds to block 722 and monitors for adjustments. If tracking is enabled, as illustrated in FIG. 8, the rules engine 530 considers the adjustment to relational data element view 404, and in accordance with a corresponding rule, generates a corresponding adjustment instruction that is sent to the geophysical view control 516 at block 726. The adjustment instruction may be, for example, to adjust the geophysical view 414 to display the focus data element indicia 410, and surrounding data element indicia 406 that come within the context of the search and are geographically proximate to the focus data element 410. Accordingly, the DEID of the focus data element indicia 410 may be included in the adjustment instruction. At block 728, it is determined if the information needed to adjust the geophysical view 416 is included in the global cache 532. This determination may be based at least partially on the DEID included in the adjustment instruction.

If the information is present in the global cache 532, at block 730, the information is extracted from the global cache 532, stored in the display buffer 534, and the geophysical view 414 is adjusted via the geophysical view control 516 and the geophysical context driver 514. If at block 728, some or all of the information is not present in the global cache 532, a request is generated with the geophysical view control 516 and transmitted to the geographic database 120 via the geo data transfer module 528 at block 732. Such a request may include, for example, the DEID and latitude/longitude information for the focus data element indicia 614, as well as a request for geographically proximate data element information. At block 734, a response from the geographic database 120 is transmitted to the geophysical view control 516. The geophysical view control 516 may parse the response and direct the geophysical context driver 514 to adjust the geophysical view 414 based on the response at block 736. In addition, at block 738, the geophysical view control 516 may update the global cache 532 and the display buffer 534, and the operation may return to block 722 on FIG. 7 to continue monitoring for adjustments.

The previously described knowledge discovery tool provides an interactive view having both a relational data element view and a geophysical view that may be operated in coordination to cohesively provide two different perspectives related to any given search or investigation. Through use of the knowledge management tool, information from a vast array of sources may be captured, cleansed, organized and provided as data elements in a searchable format. In addition, using categories associated with the data elements, a context for a search may be implemented. The context may provide categorization of the data elements related to the search for purposes of characterizing the nature of the search. Accordingly, the context may provide a framework to narrow and focus the investigation by providing a perimeter within which search-related information may be identified and displayed.

With the relational data element view and the corresponding geophysical view enabled to display search results, the user is provided a powerful multifaceted view of information related to data elements identified within the search results. Since the relationships between data elements may also be identified within the context of the search, other categories of information and data elements associated therewith may be provided in the views. In addition, the user is provided the capability to manipulate and adjust either one of the views to filter and otherwise bring into focus the search results and/or related information and provide a visually perceptible result that is fully responsive to the information being sought from the search.

While the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A computer-implemented method comprising:
   accessing a plurality of data elements;
   detecting direct relationships between some of the data elements;
   determining a total link strength between two data elements, the total link strength determined by combining i) the link strength between one of the two data elements and a third data element and ii) the link strength between the other of the two data elements and the third data element, wherein an implied valid relationship exists between the two data elements if the total link strength exceeds a threshold;
   displaying, in a display device, an interactive view comprising a first sub-view and a second sub-view, the first sub-view comprising a representation of at least one of the direct relationships and the implied valid relationship, the second sub-view comprising a representation of a context associated with the data elements;
   using a unique data element identifier (DEID) associated with a data element to retrieve first information for the data element from a first database and second information for the data element from a second database; and
   generating the first sub-view using the first information and generating the second sub-view using the second information.

2. The method of claim 1 wherein the context is geographical and the representation comprises a geophysical view, wherein the second sub-view identifies locations associated with the data elements included in the first sub-view.

3. The method of claim 1 wherein if the data element is associated with different information in different databases, then i) including the DEID for the data element in each of the databases and ii) if the data element is changed, then identifying a database of the databases to be updated and using the DEID to locate and update the data element in the database.

4. The method of claim 1 further comprising using the DEID for the data element to maintain correspondence between the first sub-view and the second sub-view.

5. The method of claim 1 wherein the first sub-view comprises an indicium indicating a relationship between the data element and another data element.

6. The method of claim 1 wherein the data elements are sorted into different categories, wherein the first sub-view comprises information identifying which category includes the data element.

7. The method of claim 1 further comprising identifying data elements that are related to each other through a chain of directly related data elements, wherein the number of links in the chain is less than a specified value.

8. The method of claim 1 wherein the link strength between two data elements is time-dependent.

9. A computer-readable storage medium having stored thereon, computer-executable instructions that, responsive to execution by a computing device, cause the computing device to perform operations comprising:
   accessing a plurality of data elements;
   detecting direct relationships between some of the data elements;
   for each of the direct relationships, deriving a link strength, the link strength based on the association between data elements having a direct relationship;
   detecting an implied valid relationship between two data elements using a total link strength that is determined by combining: i) the link strength between the first of the two data elements and a third data element and ii) the link strength between the second of the two data elements and the third data element, wherein the implied valid relationship exists if the total link strength exceeds a threshold;
   displaying, in a display device, an interactive view comprising at least one of the direct relationships and the implied valid relationship reconciled with a representation of a context associated with the data elements, wherein the interactive view comprises a first sub-view and a second sub-view, the first sub-view comprising a representation of the at least one of the direct relationships and the implied valid relationship, the second sub-view comprising the representation of the context;

using a unique data element identifier (DEID) for a data element to retrieve first information for the data element from a first database and second information for the data element from a second database; and generating the first sub-view using the first information and generating the second sub-view using the second information.

10. The computer-readable storage medium of claim 9 wherein the context is geographical and the representation comprises a geophysical view, wherein the second sub-view identifies locations associated with the data elements included in the first sub-view.

11. The computer-readable storage medium of claim 9 wherein if the data element is associated with different information in different databases, then i) including the DEID for the data element in each of the databases and ii) if the data element is changed, then identifying a database of the databases to be updated and using the DEID to locate and update the data element in the database.

12. The computer-readable storage medium of claim 9 wherein the operations further comprise using the DEID for the data element to maintain correspondence between the first sub-view and the second sub-view.

13. The computer-readable storage medium of claim 9 wherein the first sub-view comprises an indicium indicating a relationship between the data element and another data element.

14. A computer-readable storage medium having stored thereon, computer-executable instructions that, responsive to execution by a computing device, cause the computing device to generate a graphical user interface comprising an interactive view, the interactive view comprising:

a first sub-view displaying relationships between a plurality of data elements, wherein the relationships comprise at least one of a direct relationship between a first pair of data elements and an implied valid relationship between a second pair of data elements, wherein the implied valid relationship is detected by calculating a total link strength between the second pair of data elements, the total link strength calculated by combining i) the link strength between one of the data elements in the second pair and a third data element and ii) the link strength between the other of the data elements in the second pair and the third data element, wherein an implied valid relationship exists between the second pair of data elements if the total link strength exceeds a threshold; and a second sub-view comprising a representation of a context associated with the plurality of data elements included in the first sub-view, wherein there is a correspondence between the first sub-view and the second sub-view;

wherein a unique data element identifier (DEID) is associated with a data element, wherein the DEID for the data element is used to retrieve first information for the data element from a first database and second information for the data element from a second database; and wherein the first sub-view is generated using the first information and the second sub-view is generated using the second information.

15. The computer-readable storage medium of claim 14 wherein the context is geographical and the representation comprises a geophysical view, wherein second sub-view identifies locations associated with the data elements included in the first sub-view.

16. The computer-readable storage medium of claim 14 wherein, if the data element is associated with different information in different databases, then i) the DEID for the data element is included in each of the databases and ii) if the data element is changed, then a database of the databases to be updated is identified and the DEID is used to locate and update the data element in the database.

17. The computer-readable storage medium of claim 14 wherein the DEID for the data element is used to maintain correspondence between the first sub-view and the second sub-view.

18. The computer-readable storage medium of claim 14 wherein the first sub-view comprises an indicium indicating a relationship between the data element and another data element.

* * * * *